United States Patent
Falcon et al.

(10) Patent No.: US 12,254,295 B2
(45) Date of Patent: *Mar. 18, 2025

(54) DISTRIBUTED APPLICATION DEVELOPMENT PLATFORM

(71) Applicant: Grid.ai, Inc., New York, NY (US)

(72) Inventors: Williams Falcon, New York, NY (US); Luca Antiga, New York, NY (US); Thomas Henri Marceau Chaton, New York, NY (US); Adrian Wälchli, New York, NY (US)

(73) Assignee: Grid.ai, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/404,600

(22) Filed: Jan. 4, 2024

(65) Prior Publication Data

US 2024/0143294 A1    May 2, 2024

Related U.S. Application Data

(63) Continuation of application No. 18/141,632, filed on May 1, 2023, now Pat. No. 11,900,084.

(60) Provisional application No. 63/344,175, filed on May 20, 2022, provisional application No. 63/336,484, filed on Apr. 29, 2022.

(51) Int. Cl.
*G06F 8/38*    (2018.01)

(52) U.S. Cl.
CPC ..................................... *G06F 8/38* (2013.01)

(58) Field of Classification Search
None
See application file for complete search history.

(56) References Cited

U.S. PATENT DOCUMENTS

| | | | |
|---|---|---|---|
| 8,560,761 | B2 | 10/2013 | Tzeng |
| 11,361,253 | B2 | 6/2022 | Falcon et al. |
| 11,367,021 | B2 | 6/2022 | Capelo et al. |
| 11,379,140 | B2 | 7/2022 | Capelo et al. |
| 11,700,292 | B2 | 7/2023 | Curry et al. |
| 11,900,084 | B2 | 2/2024 | Falcon et al. |
| 2009/0100425 | A1 | 4/2009 | Russell |
| 2010/0146478 | A1 | 6/2010 | Head et al. |
| 2012/0185532 | A1 | 7/2012 | Kristiansson et al. |
| 2014/0282400 | A1 | 9/2014 | Moorthi et al. |
| 2014/0316543 | A1 | 10/2014 | Sharma et al. |
| 2015/0339217 | A1 | 11/2015 | Avgerinos et al. |
| 2016/0328105 | A1 | 11/2016 | Chandra et al. |
| 2017/0249349 | A1 | 8/2017 | Bhat et al. |
| 2018/0074870 | A1 | 3/2018 | Park et al. |
| 2018/0341502 | A1* | 11/2018 | Rabasa .................. G06F 9/453 |

(Continued)

OTHER PUBLICATIONS

Falcon, Williams, et al., "Virtual Machine Learning Development Environment", U.S. Appl. No. 18/772,998, filed Jul. 15, 2024.

(Continued)

*Primary Examiner* — Toan H Vu
(74) *Attorney, Agent, or Firm* — Jeffrey Schox; Diana Lin

(57) ABSTRACT

In variants, the AI/ML development system can include one or more applications, wherein each application can include: one or more components and one or more state storages. Each application can optionally include one or more event loops, one or more shared storages, and/or one or more time schedulers.

20 Claims, 17 Drawing Sheets

(56) References Cited

U.S. PATENT DOCUMENTS

| | | | |
|---|---|---|---|
| 2019/0147068 A1* | 5/2019 | Tuggle | G06F 16/252 |
| | | | 707/793 |
| 2019/0182627 A1* | 6/2019 | Thoresen | H04L 63/045 |
| 2020/0065118 A1 | 2/2020 | Nag et al. | |
| 2021/0200611 A1* | 7/2021 | Barnum | G06F 11/3644 |
| 2021/0342725 A1 | 11/2021 | Marsden et al. | |
| 2021/0382717 A1 | 12/2021 | Jiang et al. | |
| 2022/0058523 A1 | 2/2022 | Falcon et al. | |
| 2022/0107744 A1 | 4/2022 | Capelo et al. | |
| 2022/0171648 A1 | 6/2022 | Rodriguez et al. | |
| 2023/0085946 A1* | 3/2023 | Nolan | G06F 9/54 |
| | | | 715/700 |
| 2023/0367620 A1 | 11/2023 | Wilson et al. | |
| 2024/0176633 A1 | 5/2024 | Falcon et al. | |

OTHER PUBLICATIONS

David, Henrique Miguel Castilho, "Development of a Machine Learning Platform", Diss. Universidade Nova de Lisboa, 2020. (Year: 2020).

Farrell, et al., "MLPerf HPC: A Holistic Benchmark Suite for Scientific Machine Learning on HPC Systems", arXiv:2110.11466v2, Oct. 26, 2021.

* cited by examiner

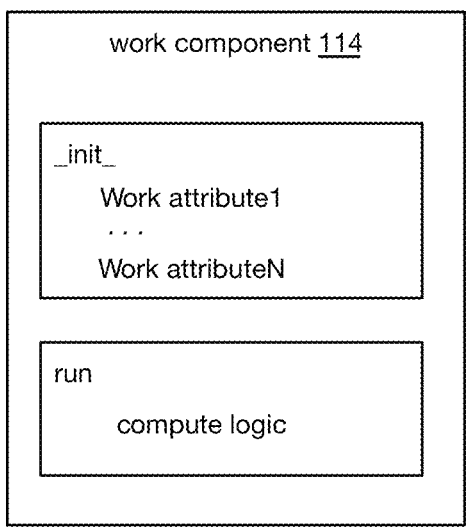
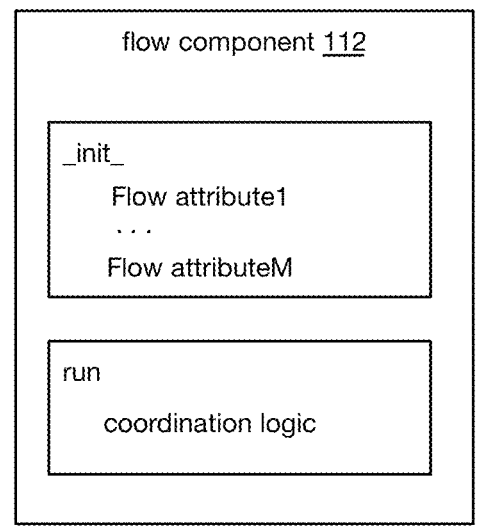
FIGURE 3A                    FIGURE 3B

100

```
import os from lightning import CloudCompute, LightningApp, LightningFlow from quick_start.components import PyTorchLightningScript, ServeScript
from quick_start.serve.serve import serve_script_path
from quick_start.train.train import train_script_path class RootFlow(LightningFlow):
    def __init__(self, use_gpu: bool = False):
        super().__init__()
        # Those are custom components for demo purposes
        # and you can modify them or create your own.
        self.train = PyTorchLightningScript(
            script_path=train_script_path,
            script_args=[
                "--trainer.max_epochs=4",
                "--trainer.limit_train_batches=4",
                "--trainer.limit_val_batches=4",
                "--trainer.callbacks=ModelCheckpoint",
                "--trainer.callbacks.monitor=val_acc",
            ],
            cloud_compute=CloudCompute("gpu" if use_gpu else "cpu", 1),
        )

self.serve = ServeScript(
            script_path=serve_script_path,
            exposed_ports={"serving": 1111},
            cloud_compute=CloudCompute("cpu", 1),
        )

def run(self):
        # 1. Run the ``train_script_path`` that trains a PyTorch model.
        self.train.run()

# 2. Will be True when a checkpoint is created by the ``train_script_path``
        # and added to the train work state.
        if self.train.best_model_path:
            # 3. Serve the model until killed.
            self.serve.run(checkpoint_path=self.train.best_model_path)
            self._exit("Hello World End")

def configure_layout(self):
        return [
            {"name": "API", "content": self.serve.exposed_url("serving") + "/docs"},
            {"name": "Wandb Run", "content": self.train.run_url},
        ]

app = LightningApp(RootFlow(use_gpu=bool(int(os.getenv("USE_GPU", "0")))))
```

```
from lightning import LightningApp, LightningFlow, LightningWork
from lightning.utilities.app_helpers import pretty_state class ChildWork(LightningWork):
    def __init__(self):
        super().__init__(run_once=False)
        # Attributes are registered automatically in the state.
        self.counter = 0 def run(self):
        # Incrementing an attribute gets reflected in the `RootFlow` state.
        self.counter += 1 class RootFlow(LightningFlow):
    def __init__(self):
        super().__init__()
        self.child_work_1 = ChildWork()
        self.child_work_2 = ChildWork()

def run(self):
        self.child_work_1.run()
        if self.child_work_1.counter % 2 == 0:
            self.child_work_2.run()
        print(f"State: {pretty_state(self.state)} \n")

app = LightningApp(RootFlow())
```

FIGURE 9

```
1   from lightning import LightningApp, LightningFlow
2
3   from video_search.encoder import Encoder
4   from video_search.search import Search
5   from video_search.video_processor.video_processor import VideoProcessor
6
7
8   class VideoMetaSearch(LightningFlow):
9       def __init__(self):
10          super().__init__()
11          self.video_processor = VideoProcessor()
12          self.encoder = Encoder()
13          self.search = Search()
14
15      def run(self):
16          self.video_processor.run()
17          if self.video_processor.has_completed:
18              self.encoder.run(self.video_processor.frames_path)
19              self.search.run(
20                  self.encoder.video_features_path,
21                  self.video_processor.frames_path,
22                  self.video_processor.video_metadata,
23              )
24
25      def configure_layout(self):
26          return [
27              {"name": "Video Processor", "content": self.video_processor},
28              {"name": "Search", "content": self.search},
29          ]
30
31
32  app = LightningApp(VideoMetaSearch())
``` predefined work components 114 user interface

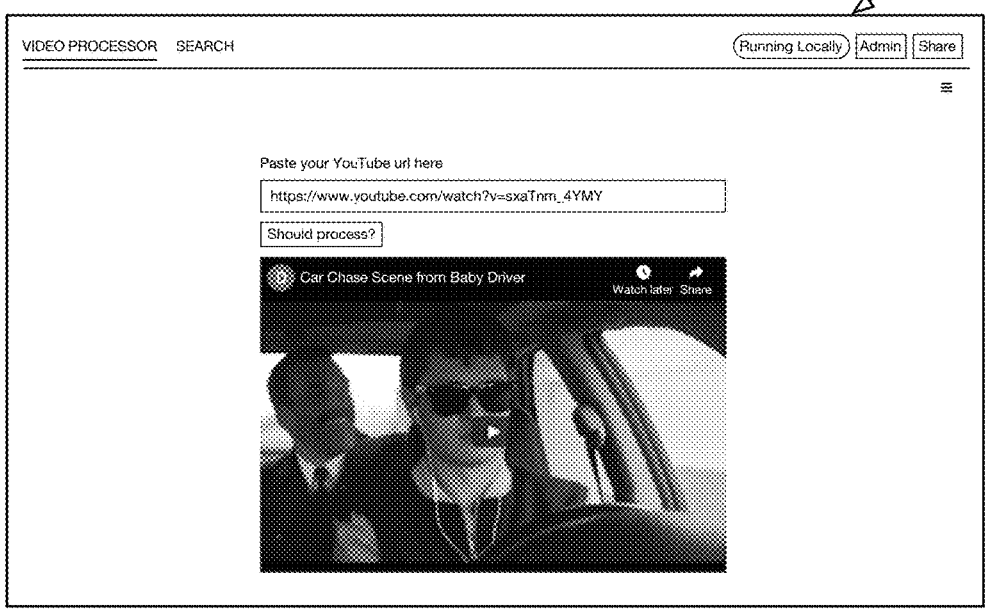

YourUserName / ... / MyApps / Fork of Video Pose Estimator [Private]     [Code] [Running on Cloud] [Open App]
                                                                                                  [Publish]

[App Overview] Components  Hardware  Run History

Accurate animal pose estimation is an essential step towards understanding animal behavior, and can potentially benefit many downstream
☐ Last edited: 04/04/2022  ◇ Computer Vision, Research

[✎ Edit]

App Components

| Status    | Name                    | Type                     | Source      | Last Run    | Total Cost |
|-----------|-------------------------|--------------------------|-------------|-------------|------------|
| ○ Running | Video Downloader        | S3 Data Download         | AWS         | Jan 20 2022 | $14.09     |
| ○ Running | Pose Estimator Trainer  | Lightning Model Training | Lightning.ai | Jan 20 2022 | $14.09     |
| ○ Running | Model Deploy            | Lightning Deploy         | Lightning.ai | Jan 20 2022 | $14.09     |

Build Logs  Stout Logs                                    [⛶ Full Screen] [.. Minimize] [⇩ Download]

```
grid-job
/kubexit/graveyard
/kubexit/graveyard/grid-job
30s
30m0s
/miniconda/bin/python /grid/runner.py python pl_mnist.py
/kubexit/graveyard/grid-job
```

FIGURE 12

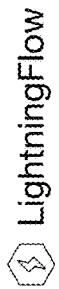

LightningWork

A LightningWork packages Python code that can run on any hardware and any cloud.

Run arbitrary Python code
A Lightning component will execute any Python code added to the run method.

Infrastructure as code
The LightningWork runs on the machine of your choice. Add custom images and even use spot pricing.

Customize the environment
A worker can use a custom image for full control over the environment.

```
import lightning as L class YourWorker(L.LightningWork):
    def run(self):
        print('RUN ANY PYTHON CODE HERE')

worker = YourWorker()
app = L.LightningApp(worker)
```

Run app

LightningFlow

A LightningFlow is a reactive orchestrator that coordinates multiple LightningWorks.

Define workers
Here we have two workers, one runs code on a cpu machine, the other on a separate GPU machine.

Connect workers
Add the workers to the orchestrator.

Implement orchestration
Use the run method to describe how workers interact together using plain python.

Enable parallelism
Here, the training runs in the background (parallel=True) and the analysis starts immediately.

```
import lightning as L class TrainComponent(L.LightningWork):
    def run(self, x):
        print(f'train a model on {x}')

class AnalyzeComponent(L.LightningWork):
    def run(self, x):
        print(f'analyze model on {x}')

class WorkflowOrchestrator(L.LightningFlow):
    def __init__(self) -> None:
        super().__init__()
        self.train = TrainComponent(cloud_compute=L.CloudCompute('cpu'))
        self.analyze = AnalyzeComponent(cloud_compute=L.CloudCompute('gpu'))

def run(self):
        self.train.run("CPU machine 1")
        self.analyze.run("GPU machine 2")

app = L.LightningApp(WorkflowOrchestrator())
```

FIGURE 17

DISTRIBUTED APPLICATION DEVELOPMENT PLATFORM

CROSS-REFERENCE TO RELATED APPLICATIONS

This application is a continuation of U.S. application Ser. No. 18/141,632 filed 1 May 2023, which claims the benefit of U.S. Provisional Application No. 63/344,175 filed 20 May 2022, and of U.S. Provisional Application No. 63/336,484 filed 29 Apr. 2022, each of which is incorporated in its entirety by this reference.

TECHNICAL FIELD

This invention relates generally to the artificial intelligence/machine learning field, and more specifically to a new and useful application development and distribution platform in the artificial intelligence/machine learning field.

BACKGROUND

Artificial intelligence and/or machine learning (AI/ML) development is generally inaccessible to software developers. This is because AI/ML development not only requires an understanding of machine learning (e.g., training data processing, model architectures, output generation, etc.), but it also requires an understanding of distributed computing (since AI/ML training and deployment requires coordination between different processes running on different machines), process orchestration, microservice stacks (since different steps of the AI/ML pipeline use different services, such as experiment trackers, feature stores, output visualization, etc.), microservice integration, and other tools and disciplines. For example, video analysis may require coordination between: YouTube™, running on a first machine, that processes a set of videos; Scale™, running on a second machine, that provides a UI for video annotation; PyTorch Lightning™, running on a cluster of machines, that run multiple experiments and/or train the model; and StreamLit™, running on a third machine, that proof-of-concepts the user interface (e.g., displays a labelled video). A user would need to understand how to use YouTube™, PyTorch Lightning™, Scale™, and StreamLit™, and the associated APIs, in order to even begin approaching this task. Even after they understand how to use each service, they would have to understand how to connect the service outputs together. Even after they understand that, the user would need to understand how to split the work across each machine, provision each machine, coordinate processes between the machines, and generally manage machine usage.

Thus, there is a need in the AI/ML field to create a new and useful facile system for AI/ML application development.

BRIEF DESCRIPTION OF THE FIGURES

FIGS. 3A and 3B are schematic representations of an example of a work component and an example of a flow component, respectively.

FIG. 5 is an illustrative example of an application.

FIG. 9 is an illustrative example of a second application.

FIG. 10 is an illustrative example of a third application and the associated user interface.

FIG. 11 is an illustrative example of an application store with multiple applications.

FIG. 12 is an illustrative example of an administrator interface (e.g., for a developer).

FIG. 17 is an illustrative example of component classes such as LightningWork and LightningFlow.

DETAILED DESCRIPTION

The following description of the embodiments of the invention is not intended to limit the invention to these embodiments, but rather to enable any person skilled in the art to make and use this invention.

1. Overview

Figure 13:
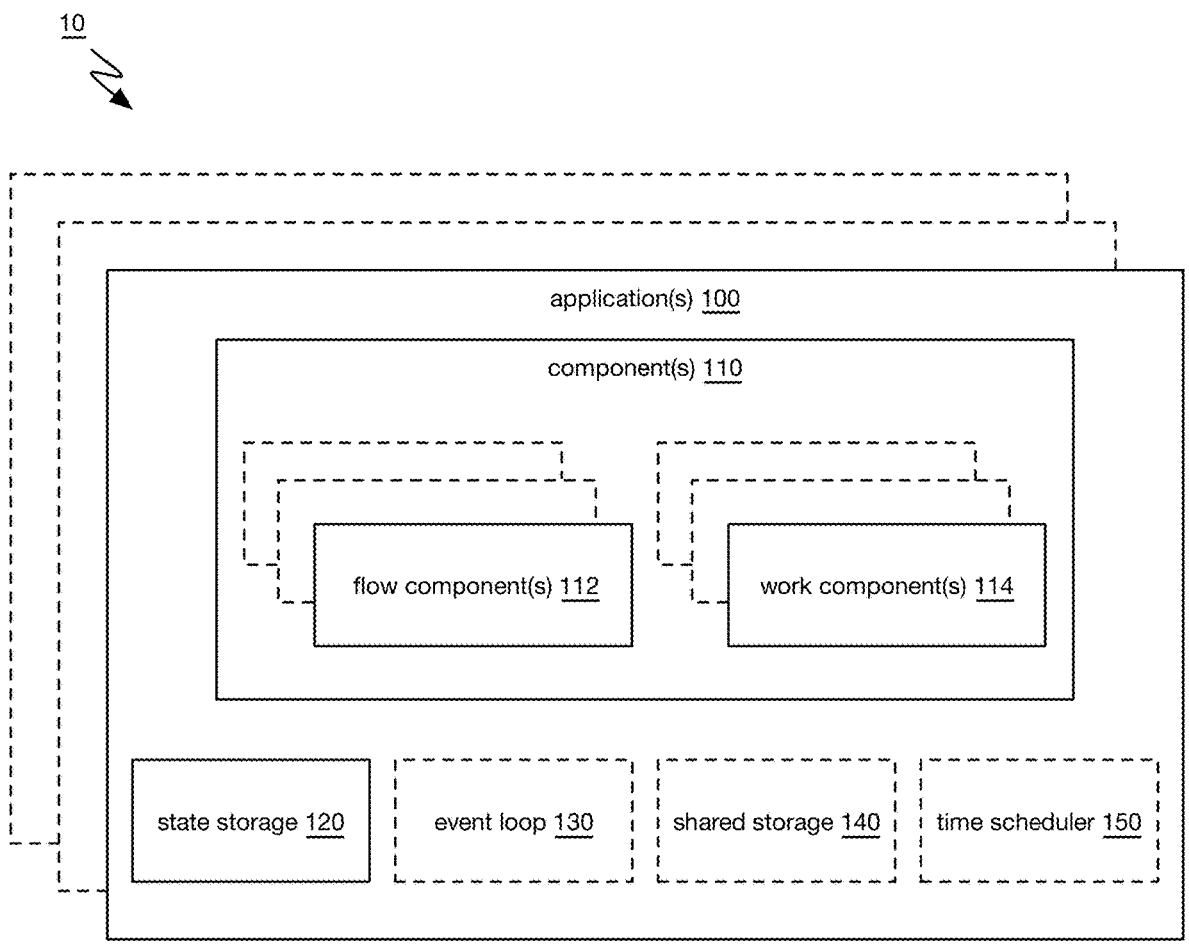
FIG. 13 is a schematic representation of a variant of the system.

As shown in FIG. 13, The AI/ML development system 10 can include one or more applications 100, wherein each application can include: one or more components 110 and one or more state storages 120. Each application can also be associated with one or more event loops 130, one or more shared storages 140, and/or one or more time schedulers 150. Each application can additionally and/or alternatively be associated with one or more user interfaces. However, system can additionally and/or alternatively include any other suitable components.

The AI/ML development system 10 functions to enable facile AI/ML development and deployment. However, the system can provide any other suitable function.

Figure 14:
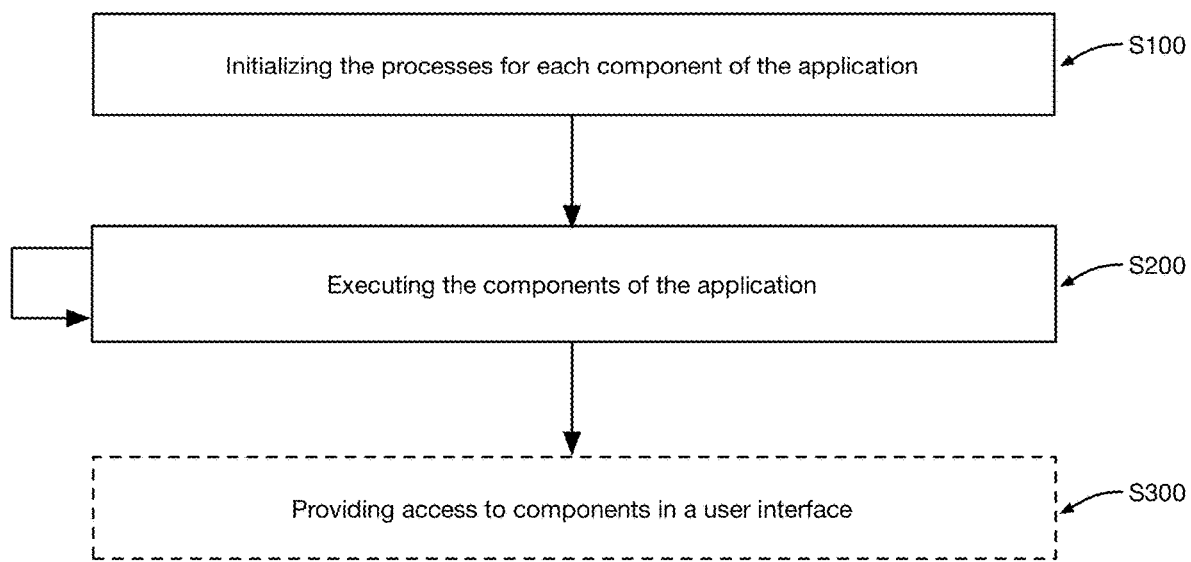
FIG. 14 is a schematic representation of a variant of the method.

As shown in FIG. 14, variants of the application execution method can include: initializing the processes for each component of the application S100; executing the components of the application S200; and optionally providing access to components in a user interface S300. However, the method can additionally and/or alternatively include any other suitable elements.

The method of application execution functions to execute the one or more applications developed using the system 10 above. However, the method can provide any other suitable function.

2. Examples

In an illustrative example, the AI/ML development system includes a plurality of applications. Each application can be developed by a different developer (e.g., different author, different entity, etc.), and be used by one or more users. Each application can include a set of components (example shown in FIG. 1). The set of components include one or more coordination logic components ("flow components") and can optionally include one or more compute components ("work components"). In variants, the applications can be associated with (e.g., subclass) an application class (e.g., LightningApp), and each component can be associated with a component class (e.g., LightningWork, LightningFlow, etc.), wherein the application and component classes abstract away machine and/or service integration complexities into single-line arguments. For example, the compute component can subclass a compute component class (e.g., LightningWork, LightningFlow, example shown in FIG. 17, etc.), which provides a hook (e.g., cloud compute) that accepts machine parameters for the machines that the compute component will be run on (e.g., type, number, model, etc.) as arguments (example shown in FIG. 5). Each application can itself include one or more applications.

Figure 4:
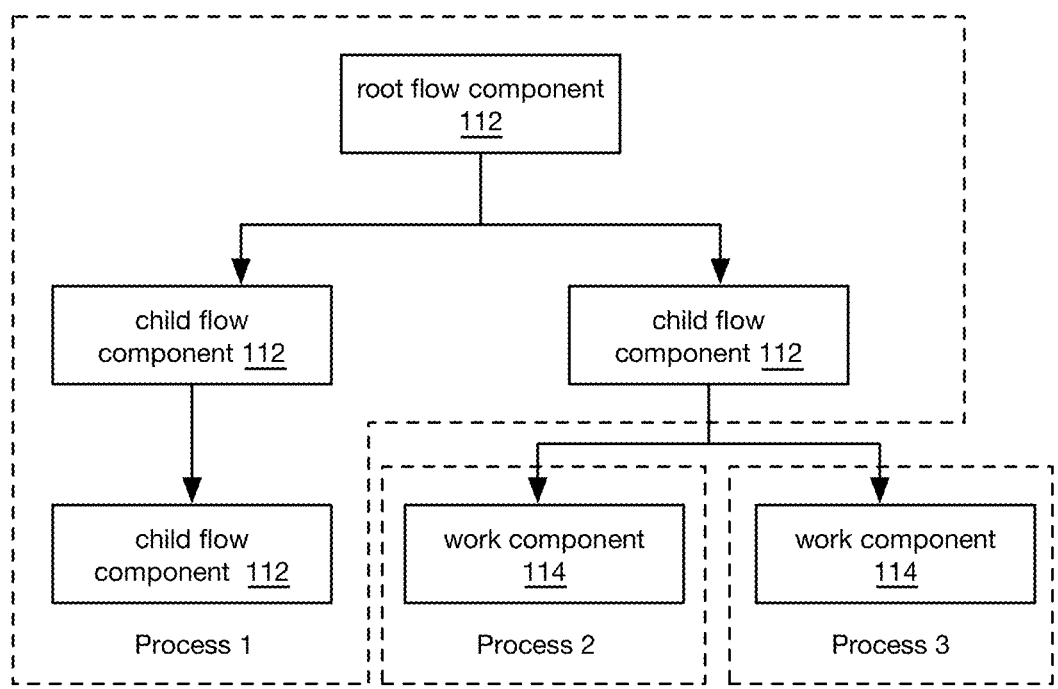
FIG. 4 is a schematic representation of an example of an application logic tree and the associated processes.
Figure 6A:
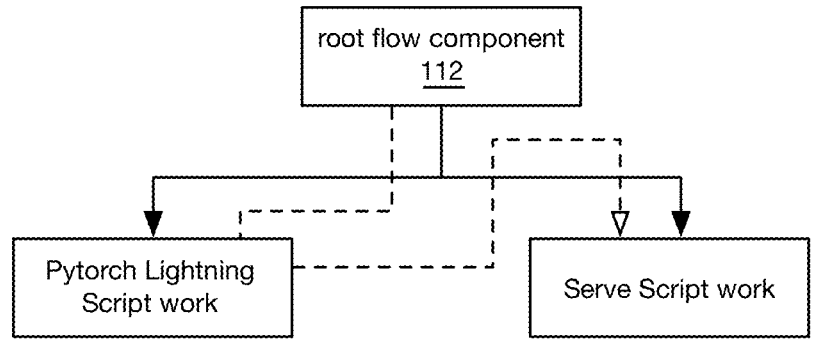
FIG. 6A is a schematic representation of the illustrative example's logic tree and component execution order.
Figure 6B:
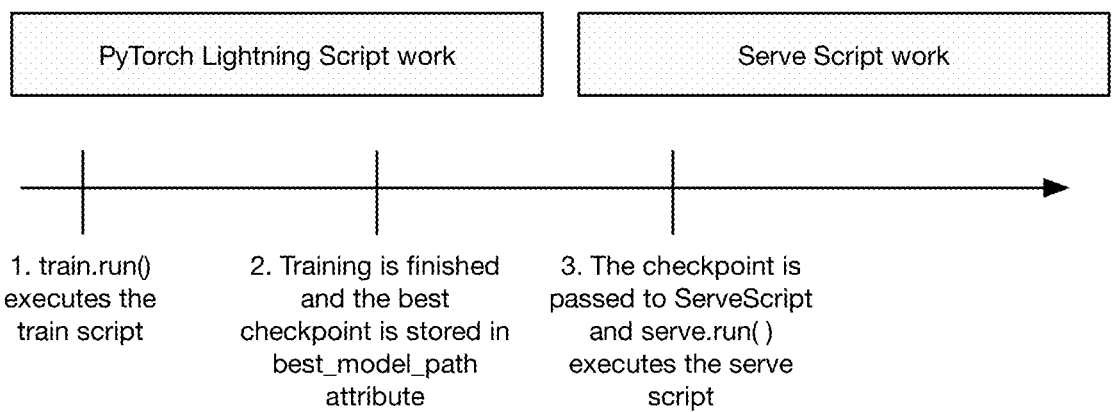
FIG. 6B is a schematic representation of the illustrative example's execution.
Figure 7:
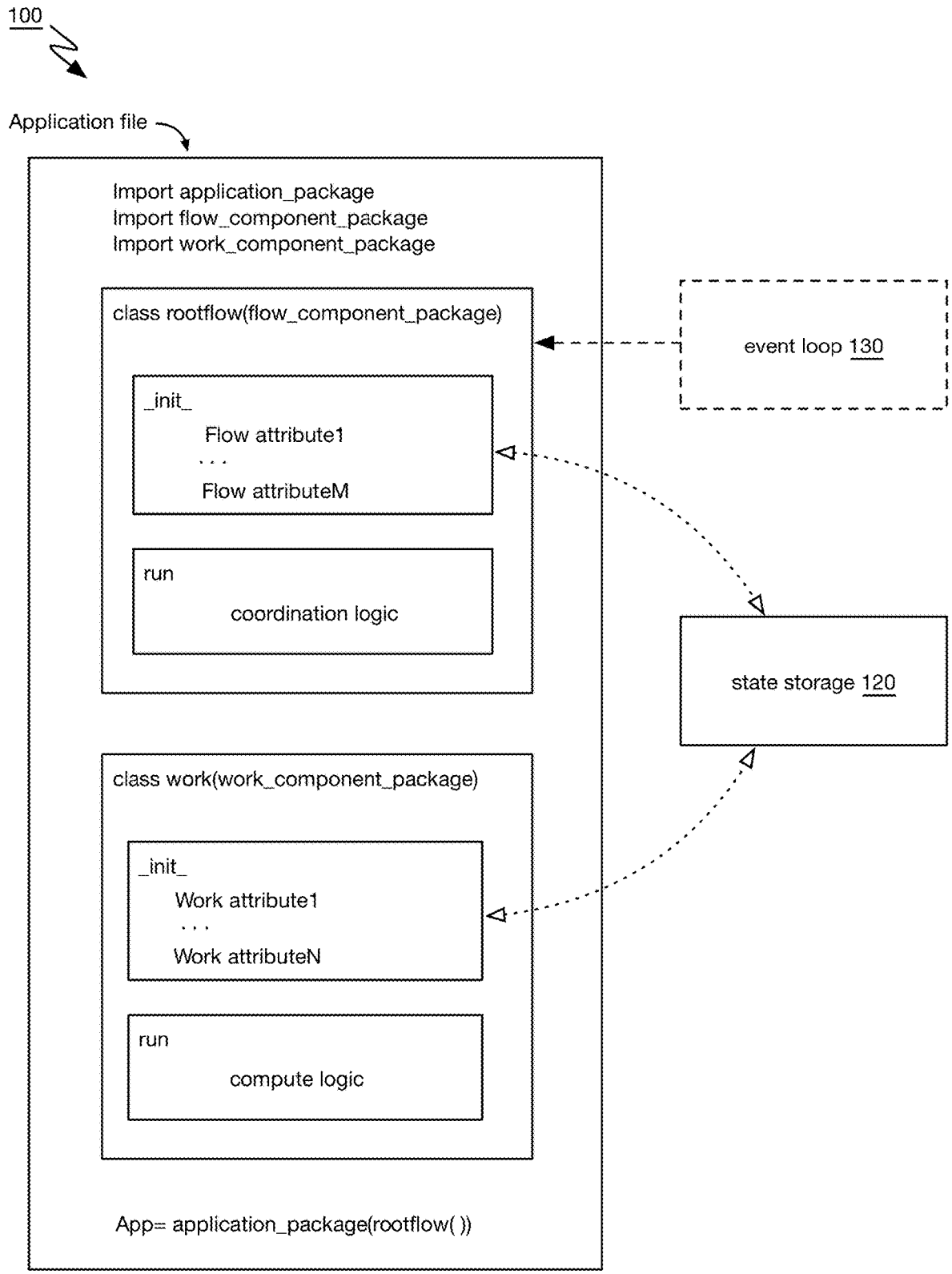
FIG. 7 is a schematic representation of an example of an application.
Figure 8:
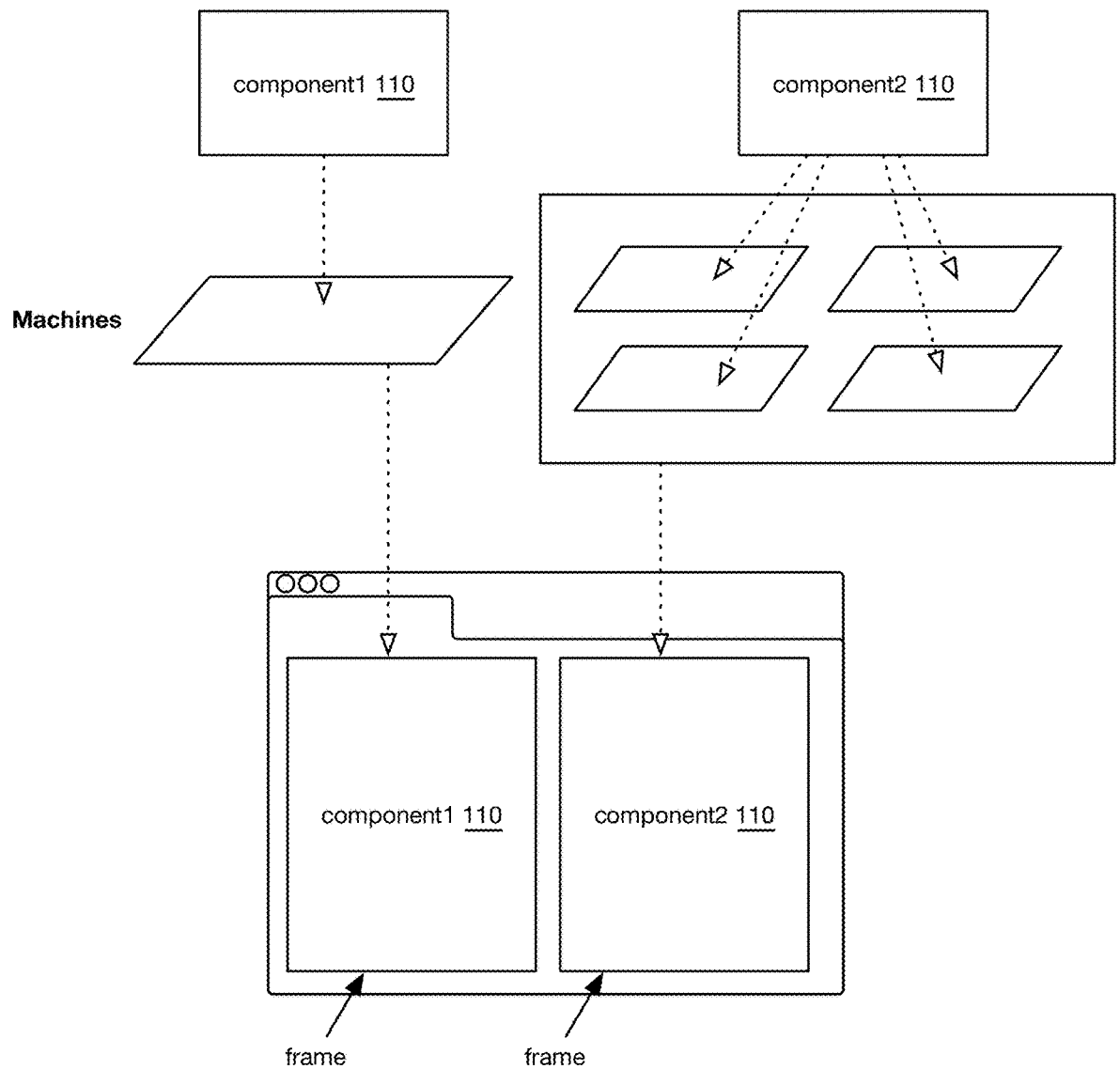
FIG. 8 is a schematic representation of an example of the relationship between the components, machines, and the user interface.

In an illustrative example of operation, the coordination logic components can all execute on a shared process (e.g., a single process), while the compute components each execute in separate processes (e.g., on separate machines) (e.g., example shown in FIG. 4). The application can automatically determine the attributes of each component (e.g., the public variables of each component, determined from a standard attribute definition function, such as _init_), wherein the values bound to the attributes of each component cooperatively form the component's state. To coordinate between the processes, the application can automatically track each component's state and/or state change in state storage (e.g., example shown in FIG. 7), successive components can be executed based on the components' states (e.g., immediately, such as for flow components; asynchronously, such as for work components; examples shown in FIG. 1 and FIG. 7). In a first specific example, an event loop can repeatedly trigger execution of the top-level component (e.g., the "run" method), which in turn can call a series of child components (e.g., their "run" methods); this can enable the components to have their executions immediately reflect changes in state variable values. In a second specific example, a time scheduler can repeatedly trigger the event loop at recurring intervals. In variants, the application can also generate a user interface formed from a set of frames (e.g., iFrames). In this example, each displayed component is associated with a different frame, and provides its own interface (e.g., running on the component's respective process and/or machine) through said frame (e.g., example shown in FIG. 8).

However, AI/ML applications can be otherwise configured and/or used.

3. Technical Advantages

Variants of the technology can confer several benefits over conventional systems. In particular, this technology can eliminate the complexity discussed above. In variants, an entire machine learning application can even be defined in a single file. This allows users, such as researchers, data scientists, and/or software engineers, to build reactive, scalable, cost-effective, easy-to-maintain and reliable production-ready AI apps using the tools and technologies of their choice, regardless of their engineering expertise.

First, variants of the technology segregate coordination logic from compute (e.g., jobs, third-party services, etc.), instead of forcing them to be interleaved together as in conventional systems. This enables the coordination logic and compute to be executed in separate processes, which, in turn, enables each process to be executed on a different machine. In embodiments, this separation is reinforced by providing different component types—one for coordination logic ("flow") and one for compute ("work")— each associated with a different set of capabilities and functionalities. For example, the compute component can accept arguments for the machine type, number, and model that should be used to run the compute. In another example, the flow component can automatically expose and track all public attributes (e.g., variables) for itself and any child components (e.g., referenced in the flow's coordination logic) in shared state storage, which enables cross-process coordination and data sharing. In further variants, data (e.g., binary data, artifacts, etc.) can be shared across components (e.g., work components) using shared storage. These, in turn, enables developers to design asynchronous, dynamic, and reactive workflows.

Second, variants of the technology can further reduce hardware integration complexity and enable scalability by providing a module for each machine type, then executing the respective modules for the machine types specified in the application (e.g., specified by each work component). This can also enable the same exact code to be locally debugged but deployed in the cloud (e.g., by selecting different modules for each development phase). In examples, the technology can use the systems and methods (e.g., the "accelerators" and "orchestrators") disclosed in U.S. application Ser. No. 17/741,028 filed 10 May 2022, which is incorporated herein in its entirety by this reference. In variants, users (e.g., developers) can also specify which machines to use (e.g., the local computer, a cloud service, a machine provider account, an on-premises machine, etc.), wherein the technology can automatically use user-provided credentials (e.g., API token, username/password, etc.) to access the specified machines for automatic provisioning and management.

Third, variants of the technology enable computational savings by automatically suspending and reviving flow components, which reduces the amount of processing power consumed by continuously running the flow components. For example, flow components can be suspended after processing a prior set of state updates, and revived when state updates are available, at a predetermined interval (e.g., as determined by a scheduler), and/or at any other suitable time.

Fourth, variants of the technology enable accurate computer operation by tracking component state changes instead of absolute component states. This can remove or reduce the time dependency on state changes, and can result in the same outcome regardless of when a state change is received at the state storage. However, the technology can alternatively receive and/or track the absolute component states.

Fifth, variants of the technology can automatically create an application with one or more user interfaces, with minimal or no user interface coding. In an illustrative example, variants of the technology can leverage pre-existing user interfaces of the work components by automatically creating an application interface (e.g., a browser, native interface, etc.) that includes a frame (e.g., iFrame) for each work component in the same or different parent windows, wherein each frame can link to and/or display the (pre-existing) user interface of the respective work component used by the application.

However, further advantages can be provided by the system and method disclosed herein.

4. System

The AI/ML development system 10 can include one or more applications 100, wherein each application can include: one or more components 110 and one or more state storages 120. Each application can be associated with one or more event loops 130, one or more shared storages 140, and/or one or more time schedulers 150. However, the system can additionally and/or alternatively include any other suitable component. In variants, the applications 100 can be associated with an application class (e.g., LightningApp), and each component 110 can be associated with a component class (e.g., LightningWork, LightningFlow, etc.).

The one or more applications 100 function to define a full-stack AI/ML application. A full-stack AI/ML application can: obtain training data, develop or train models, log artifacts, serve or deploy models, and/or perform any other suitable capabilities. However, the one or more applications 100 can provide any other suitable function. For example, the applications 100 can define: machine-level integrations (e.g., driver integrations), provider-level integrations (e.g., cloud provider integrations), third-party service integrations, frontend integrations, presentation-level integrations, data integrations, communications-level integrations, business process integrations, in addition to any custom logic for the application. However, the applications 100 can define any other suitable integration and/or logic. The applications 100 can be web applications, native applications, hybrid applications (e.g., a web application that has as native application shell), and/or any other suitable applications.

Figure 1:
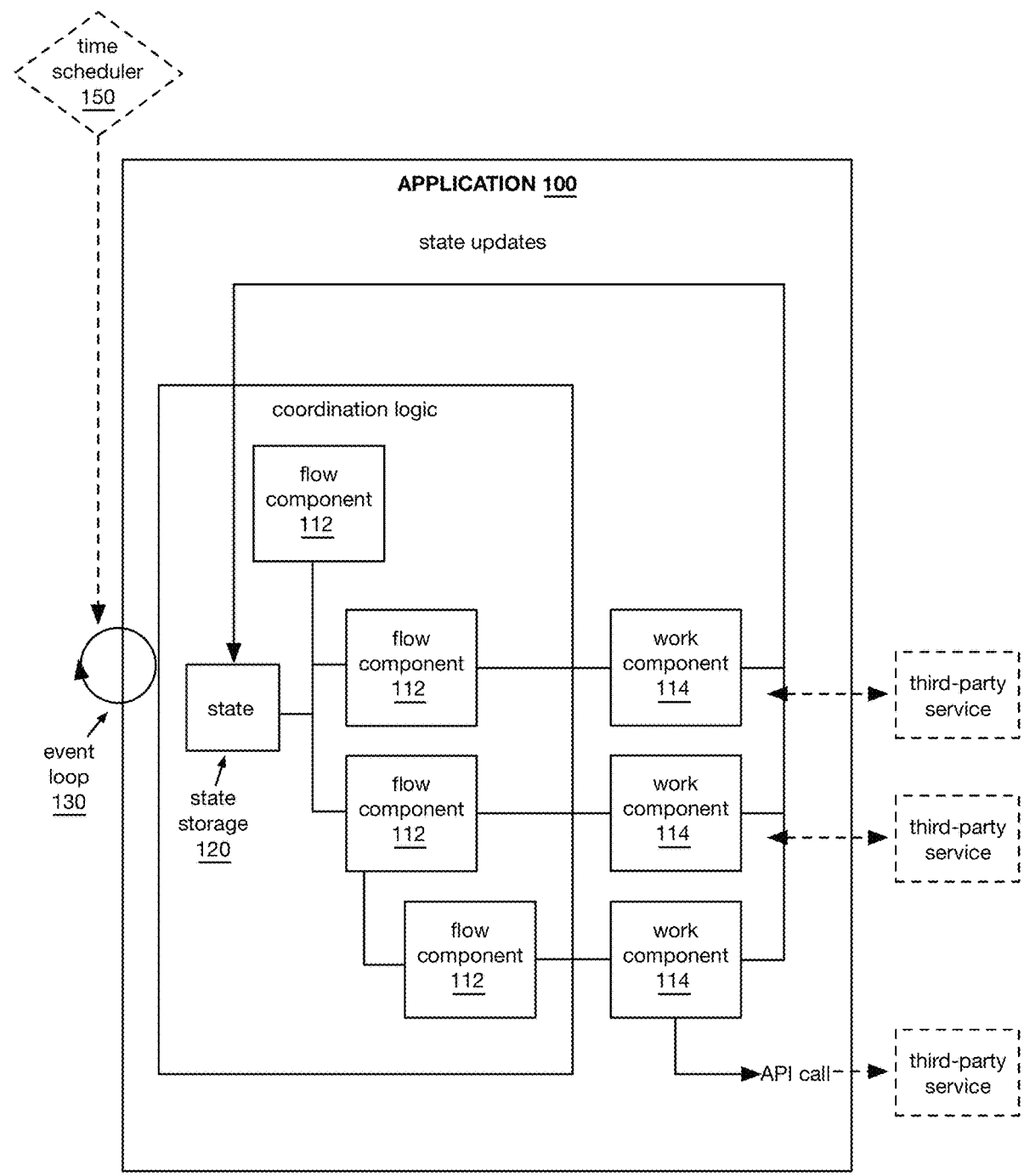
FIG. 1 is a schematic representation of an example of an application.
Figure 2:
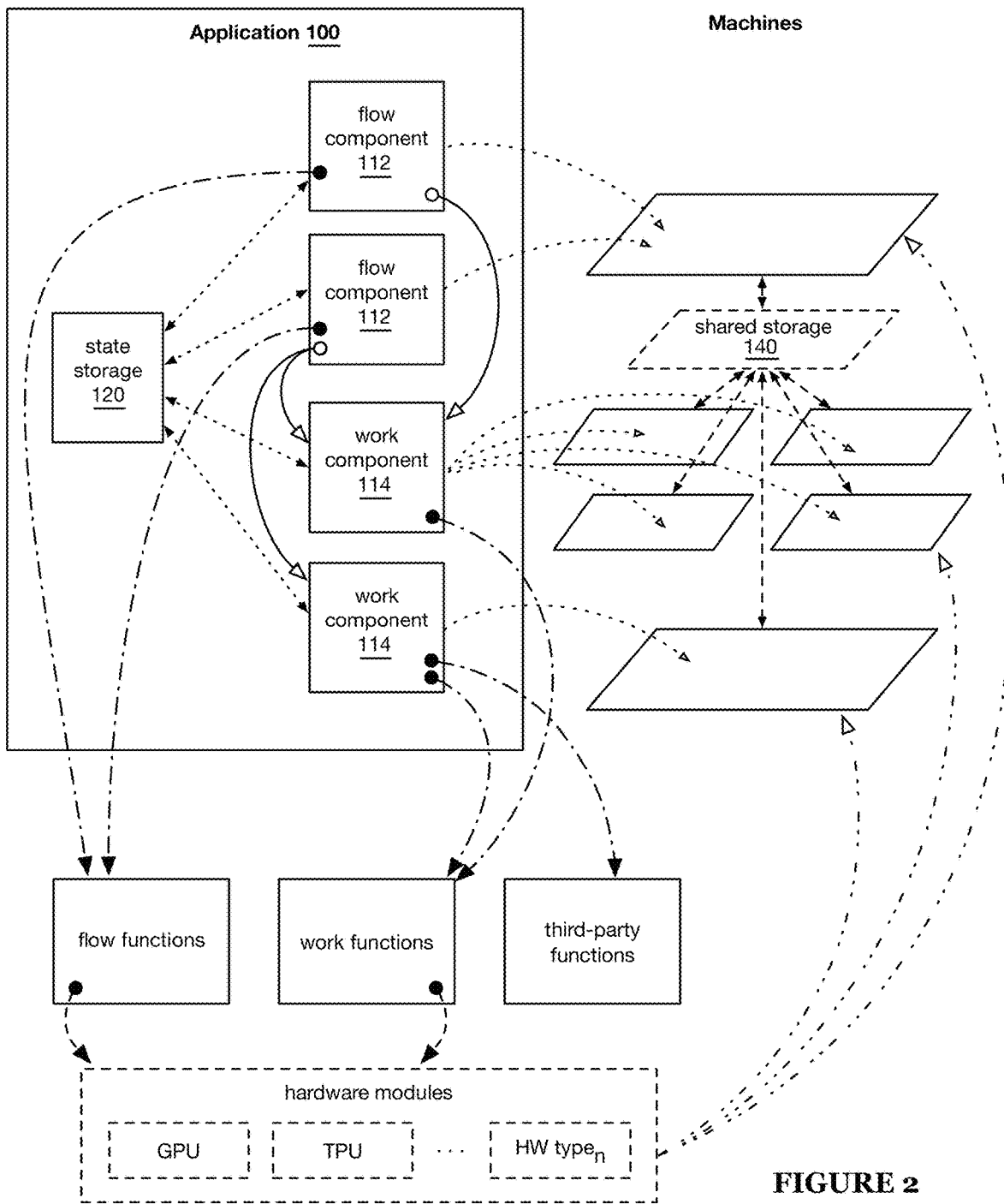
FIG. 2 is a schematic representation of the relationships between an example of the application, standard functions, hardware modules, and machines.

Each application 100 can include a set of one or more components 110 (discussed in further detail below); examples shown in FIG. 1 and FIG. 2. The component set preferably includes one or more flow components 112 (e.g., a coordination logic component), but can additionally and/or alternatively include one or more work components 114 (e.g., a compute component), and/or any other suitable components. In a first example, the application 100 includes a single component 110, wherein the single component 110 is a work component 114. In a second example, the application 100 includes a single flow component 112 and a plurality of work components 114. In a third example, the application 100 includes a plurality of flow components 112 and one or more work components 114. In a fourth example, the application 100 includes a set of applications 100 (e.g., sub-applications), wherein each sub-application is itself an application (e.g., includes one or more flow components 112, work components 114, etc.). In this example, the sub-applications can each have a different state storage 120 and/or shared storage 140, and/or share the same state storage 120 and/or shared storage 140. However, the application 100 can include any other suitable component set.

The component set of an application 100 preferably cooperatively defines a logical tree, but can additionally and/or alternatively be organized in a series of components, a hierarchy of components, a pool of components, and/or have any other suitable logical structure or organization. When the component set cooperatively defines a logical tree, the entire application 100 is preferably executed by running the root component (e.g., the root flow component 112), but can additionally and/or alternatively be executed by running a child component, and/or otherwise executed. The root component is preferably a flow component 112, but can additionally and/or alternatively be a work component, and/or any other suitable component. For example, an application 100 can include: a root flow component 112 that coordinates between: a model development work component 114 (e.g., PyTorch Lightning™ component), an MLOps work component 114 (e.g., Weights & Biases™), an experiment work component 114 (e.g., Comet™), a feature store component (e.g., Tecton™), and a deployment work component 114 (e.g., SageMaker™).

Each application 100 is preferably authored by a developer, but can additionally and/or alternatively be authored by one or more entities, and/or be otherwise authored. Each application 100 can be authored by different authors (e.g., different developers, different entities, etc.), but can additionally and/or alternatively be authored by the same authors. The application 100 is preferably created programmatically (e.g., a command-line interface; an API; etc.; examples shown in FIG. 5, FIG. 9, and FIG. 10; etc.), but can alternatively be created using a codeless interface (e.g., a graphical user interface, a drag-and-drop interface, etc.), and/or otherwise created. For example, within a codeless interface, predefined components can be represented as icons, and their attributes can be surfaced as connection points. However, the applications 100 can be otherwise created. The applications 100 can be public (e.g., accessible to users outside of an entity or organization, available on an application store, etc.), or private (e.g., only accessible to users within an entity or organization, only accessible to users with authorized user credentials, etc.).

The applications 100 can be used by one or more users (e.g., separate from or the same as the developer), wherein each user can be associated with (e.g., use) the same or different instance of the application 100. The applications 100 can be executed on the developer's machines, the user's machines, a platform's machines, a third-party's machines (e.g., cloud provider machines), and/or any other suitable machines. Each application 100 can be executed on a plurality of machines controlled by different entities, or be executed on a set of machines controlled by a single entity. The set of machines can be heterogeneous (e.g., different machines, such as a mix of CPUs, GPUs, TPUs, IPUs, and/or other machines), homogeneous (e.g., all the same type of machine), and/or have any other composition.

The user (e.g., end user, developer, etc.) can interact with the application 100 using one or more mechanisms. Interacting with the application 100 can include: submitting a request, uploading input, setting parameters (e.g., hyperparameters, etc.), receiving outputs (e.g., model outputs, logs, artifacts, etc.), and/or otherwise interacting with the application 100. The user can interact with the application 100 through an automatically generated interface, a native interface for the work component 114 (e.g., when the work component 114 is a third-party service), a custom interface (e.g., generated by the application 100 or the flow component 112), and/or through any other suitable interface. In an example, the system 10 can automatically generate an interface for the application 100, wherein each surfaced work component 114 can be associated with a frame (e.g., an iFrame) that displays the work component's native interface. Each frame can be on the same or different parent window. The work component 114 can be a surfaced work component (e.g., shown on the interface) or an unsurfaced work component (e.g., not shown on the interface), wherein the surface state can be specified by a flow component 112, by a toggle, or otherwise specified.

Figure 11:
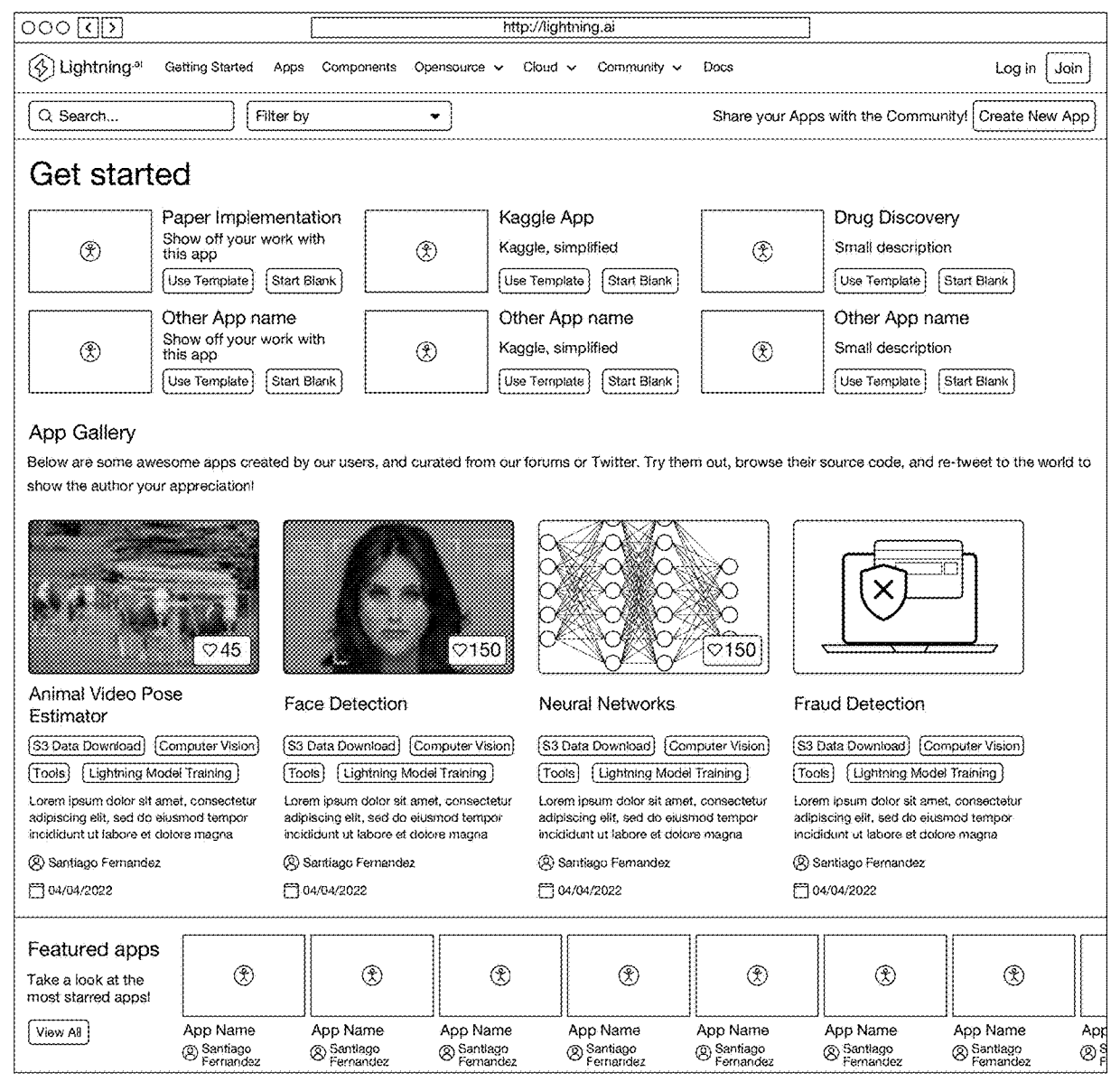
Figure 15:
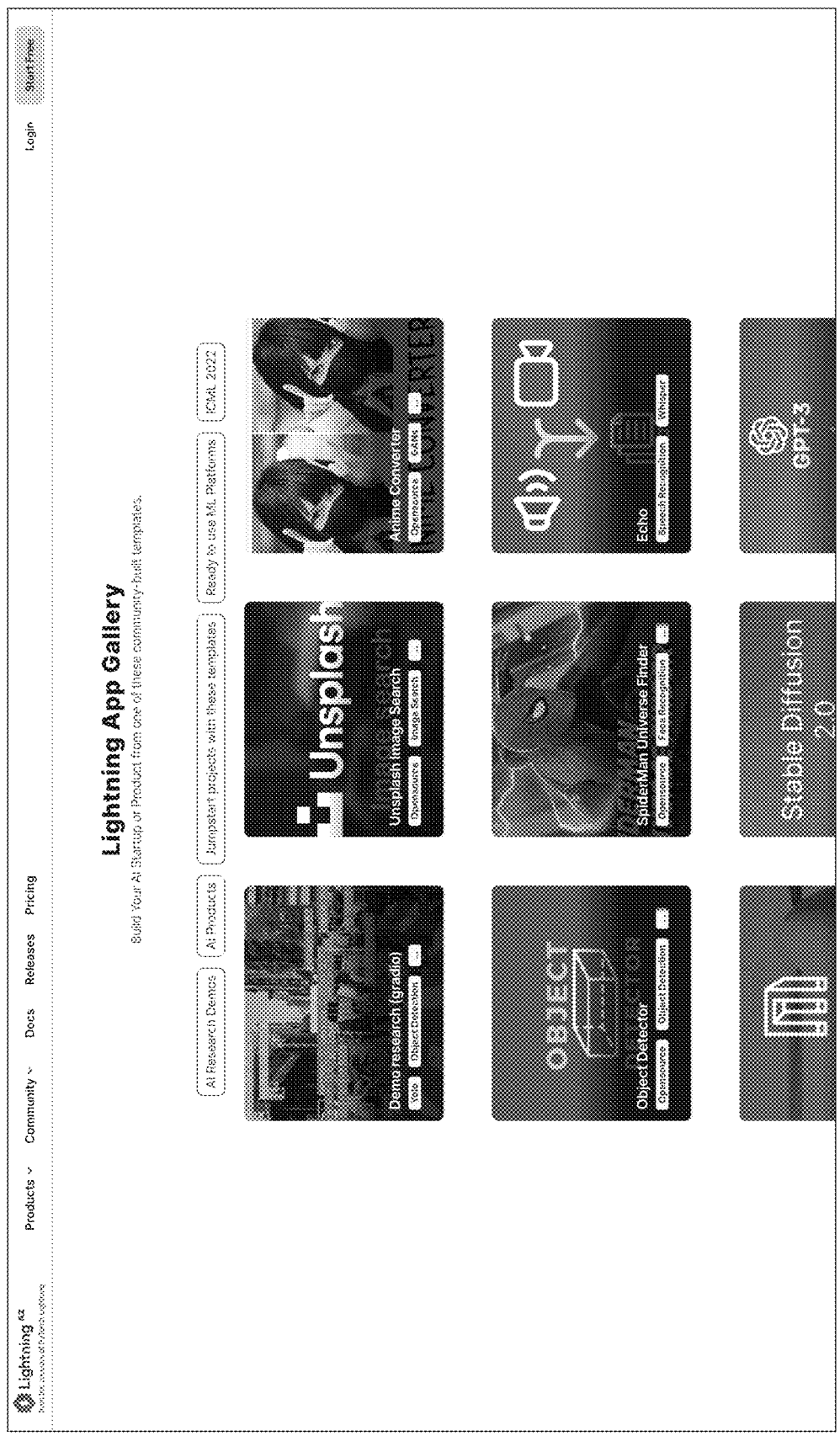
FIG. 15 is an illustrative example of an application store with multiple applications.

The user (e.g., developer, end user, etc.) can interact with multiple instances of an application 100: through an interface, through the flow component 112, through the native interfaces provided by the work components 114, and/or otherwise interact with multiple instances of the application. In a first variant, the user can manage all instances of the application 100 in an interface (e.g., a graphical user interface, example shown in FIG. 12, etc.). In a second variant, the user can modify the machine parameters within the application 100 (e.g., modify each component's machine arguments) to specify the user's machines; download the application 100 and run the application 100 locally; and/or otherwise execute the application on the user's machines. The applications 100 can be accessible via an application store (e.g., examples shown in FIG. 11 and FIG. 15), a reference (e.g., a URI), a repository (e.g., a GitHub repository, an Amazon S3 repository, etc.), and/or through any other suitable mechanism.

Each application 100 can execute on a distributed computing system, a centralized computing system, a remote computing system, a local computing system, and/or any other suitable type of computing system. The one or more individual machines in the computing system can be: remote (e.g., a cloud computing system), local, provided by the user, provided by another entity (e.g., a cloud computing provider), provided by the developer, and/or otherwise configured. In variants, processes (e.g., flow components 112, work components 114, etc.) process artifacts (e.g., shared storage items), and/or other portion of the application 100 can be managed using a distributed computing orchestration system. For example, applications 100 can be managed by the distributed computing orchestration system discussed in U.S. application Ser. No. 17/748,743 filed 19 May 2022, incorporated herein in its entirety by this reference (e.g., wherein the processes can be managed in the same manner as experiments). However, processes can be otherwise managed.

Each application 100 can be associated with a state storage 120, an event loop 130 (examples shown in FIG. 1 and FIG. 7), a shared storage 140, a time scheduler 150 (example shown in FIG. 1), and/or an any other suitable data objects.

The state storage 120 functions to track the application state and/or component states. However, the state storage 120 can provide any other suitable function. In variants, because the flow components 112 and/or work components 114 can all access the same state storage 120, tracking the component states in a singular location can enable any component 110 from the application's component set to react to any other component state changes by simply referencing the other component's state component (e.g., attribute) within the flow. The state storage 120 preferably tracks the component states of work components 114, but can additionally or alternatively track the component states of flow components 112, the component state of other components (e.g., components within the application 100, component external to the application 100, etc.), the application state, and/or any other suitable state. Each component's state can be associated with time data (e.g., time period, timestep, timestamp, etc.) or not be associated with time data. The state storage 120 can track: the component's state (e.g., the values for the constituent set of attributes), the component's state changes (e.g., the change in values for the constituent set of attributes; a set of state changes, a time-series of state changes, etc.), and/or any other suitable representation of the component's state.

Each component's state can be defined by or include one or more values for each attribute (e.g., variable) defined within the component, include component telemetry (e.g., execution state, such as running, paused, completed, failed, etc.), and/or be otherwise defined. The values can be discrete, continuous, binary, multiclass, numerical, categorical, and/or otherwise structured. Each component's state can be represented as a vector (e.g., of values of attributes), an aggregated value (e.g., of values of attributes), and/or be otherwise represented. The stored state of each component 110 is preferably JSON-serializable (e.g., int, long, float, bool, list, dict, str, etc.), but can additionally and/or alternatively be XML-serializable, BSON-serializable, YAML-serializable, and/or otherwise serializable.

The application 100 can automatically identify the attributes of each component 110, wherein the state storage 120 tracks the values bound to each attribute. Alternatively, the application 100 does not automatically identify the attributes of each component 110. The component attributes can be: extracted from a standard, required function or variable definition section within each component 110 (e.g., "_init_"; example shown in FIG. 7); identified during execution (e.g., wherein the state storage 120 is updated with newly initialized attributes during execution); manually specified (e.g., by the developer, by the user, etc.); specified by an application-level specification (e.g., extracted from a standard variable definition section in the specification); and/or otherwise identified.

During execution, each component 110 can be periodically (e.g., every second, every minute, hourly, daily, monthly, quarterly, yearly, etc.) queried for state updates, randomly queried for state updates, automatically push state updates to the state storage 120 (e.g., wherein the components 110 can include a function that pushes state updates to the state storage 120, wherein the state storage address or identifier can be provided to the component during setup or provisioning, etc.), publish state updates to the state storage 120 (e.g., wherein the state storage 120 is a subscriber), and/or otherwise update the component state in the state storage 120. A component's state is preferably: directly provided to the state storage 120 by the component itself or by a parent component, or by an agent executing on the same process, machine, or virtual environment as the component, but can additionally or alternatively be provided by a child component, by a sibling component, and/or by any other suitable module. In a specific variant of the system, the component state can be strictly hierarchical: parent components can have access to their state and their children components' states, but child components cannot access their parent components' states nor their sibling components' states.

The component states of a given component can be accessible by: all components 110, only related components 110 (e.g., parent components, child components, sibling components, etc.), only components 110 within a component tree branch, a subset of authorized components 110 (e.g., authorized in the given component, authorized by the application, etc.), and/or otherwise accessible or inaccessible. Access is preferably read-access (e.g., from the shared state storage 120, directly from the component 110 itself), but can additionally or alternatively include write access (e.g., wherein the other component 110 can change the given component's state). In a first example, parent components 110 have access (e.g., read/write access) to its own attributes (e.g., state variables), and can additionally have access (e.g., read only access, read/write access, etc.) to those of its children components 110 and/or all its descendant children components 110 (e.g., not just its immediate children). In a second example, each component 110 can report its own state to the state storage 120, have read-only access (e.g., no write access) to other components' state variable values, and/or otherwise access other components' states.

In variants, states and/or state updates can be communicated across processes using a delta algorithm and/or any other suitable algorithm. In these variants, the changes (e.g., state value changes) generated across component trees can be collected as delta updates on a flow process (e.g., of the master flow component 112, the parent flow component 112 of the component tree) and applied sequentially to the state. The updated state can then be propagated down the tree to all components 110 (e.g., and respective processes). However, state changes can be otherwise aggregated and/or propagated to other components.

Each application 100 preferably includes a single state storage 120, but can additionally and/or alternatively include multiple state storages 120 (e.g., one for each component 110, one for each set of components, etc.), and/or any other suitable number of state storages. The state storage 120 is preferably initialized with the application 100, but can additionally and/or alternatively be initialized after the initialization of the application 100, initialized before the initialization of the application 100, and/or be initialized at any other suitable time. The state can be stored in state storage 120 by the machine executing the flow components 112 (e.g., the coordination logic), but can additionally and/or alternatively be stored on one or more machines executing the work components 114, and/or any other suitable machine. The state storage 120 can be a queue, buffer, stack, array, stream, cache, and/or any other suitable storage object.

However, the state storage can be otherwise configured.

Applications 100 can optionally include shared storage 140, which functions to exchange data (e.g., values to be transformed by different components) between different components 110 (e.g., different work components 114, different flow components 112, different work and flow components, etc.). Examples of data that can be exchanged include: artifacts, training data, test data, logs, and/or other suitable data. Each application 100 can include one or more shared storage instances. Each application 100 is preferably associated with a single shared storage 140, but can additionally and/or alternatively be associated with multiple shared storages 140 (e.g., one for each component 110, one for each set of components, etc.), and/or any other suitable number of shared storages. In a first example, an application 100 can interact with a single shared storage 140, wherein the shared storage 140 can have substorage (e.g., subfolders, sub-filepaths, etc.) for different components 110 of the application 100. In a second example, the application 100 can interact with a single shared storage 140, wherein different components 110 write to a shared folder. In a third example, the application 100 can interact with multiple shared storages 140 (e.g., one for each component, one for each component tree branch, one for each set of components, one for each work service provider, etc.), wherein the application 100 indexes the shared storage identifiers (e.g., filepaths, URIs, etc.) for the multiple shared storages 140 and optionally passes the shared storage identifiers to the other components 110 (e.g., using a flow component 112, etc.).

The shared storage 140 can be managed by a single flow component 112 (e.g., the root flow component 112, a child flow component 112, etc.), by multiple flow components 112, by one or more of the work components 114, and/or by any other suitable component.

The shared storage 140 can be stored on the machine executing the flow component(s) 112, a machine executing a work component 114, a machine executing both flow component(s) 112 and work component(s) 114, a machine not executing neither flow component 112 nor a work component 114, and/or any other suitable machine. The shared storage 140 is preferably centralized storage (e.g., all components 110 write to the same storage provider or storage hardware), but can alternatively be distributed (e.g., across different pieces of storage hardware, across different storage providers, across different machines, etc.).

The shared storage 140 can be initialized with the application 100, after the initialization of the application 100, before the initialization of the application 100, and/or be initialized at any other suitable time. The shared storage 140 can be a queue, buffer, stack, array, stream, cache, and/or any other suitable storage object. The components 110 can access the shared storage 140 using a shared storage identifier (e.g., the path object, a filepath, a URI, etc.), wherein the shared storage identifier can be stored as an attribute value (e.g., in the application state), passed to the components 110, or otherwise shared between components 110. In variants, the shared storage 140 can be the artifact storage discussed in U.S. application Ser. No. 17/833,421 filed 6 Jun. 2022, incorporated herein in its entirety by this reference, wherein exchanged data is managed in a similar manner to artifact management.

The values stored in the shared storage 140 can be: datum (e.g., numbers, text, etc.), payloads (e.g., identifiers, arbitrary data objects, etc.), and/or any other suitable type of information. When the payload is an identifier (e.g., pointers, filepaths, URIs, etc.), the process referencing the pointer can retrieve the arbitrary data object referenced by the pointer, and/or otherwise access the arbitrary data object. The arbitrary data object can be retrieved using an arbitrary transport mechanism (e.g., file transfer, streaming, etc.) and/or an arbitrary serializer (e.g., Tensor serializer, etc.). The transport mechanism and/or serializer can be automatically implemented by the payload, automatically implemented upon data object access, specified by the payload or arbitrary data object (e.g., and implemented by the retrieving process), and/or otherwise implemented.

However, the shared storage can be otherwise implemented and/or configured.

The optional event loop 130 functions to ensure that the application's components 110 respond to state changes (e.g., ensure that the application keeps running). However, the event loop 130 can provide any other suitable function. Each application 100 is preferably associated with a single event loop 130, but can additionally and/or alternatively be associated with multiple event loops 130, and/or any other suitable number of event loops. The event loop 130 is preferably an infinite event loop, but can additionally and/or alternatively be a finite event loop, semi-infinite event loop, and/or any other suitable event loop. The event loop 130 preferably calls the root component 110 (e.g., root flow component 112), but can additionally or alternatively call child components (e.g., child work components 114, child flow components 112, etc.), the last-executed component 110, a component 110 identified by the application 100 before application suspension for subsequent execution (e.g., wherein the component identifier is stored in storage for post-revival execution), and/or call any other suitable components. The event loop 130 preferably runs at a predetermined frequency (e.g., every 0.1 s, 0.01 s, 1s, minute, hour, day, week, month, year, etc.), but can additionally and/or alternatively run responsive to occurrence of a trigger event (e.g., by a time scheduler 150, when a user submits a request, when a user refreshes the page, etc.), at random times, and/or be otherwise executed at any other suitable time and/or frequency. The event loop 130 is preferably initialized with the application 100, but can additionally and/or alternatively be initialized after the initialization of the application 100, before the initialization of the application 100, and/or be initialized at any other suitable time.

However, the event loop can be otherwise configured.

The optional time scheduler 150 functions to periodically execute one or more of the application components 110. The time scheduler 150 can be particularly useful when the application 100 and/or components 110 thereof (e.g., the flow components 112) are suspended (e.g., post-execution, after a threshold amount of time, after a threshold amount of time without a state change, etc.), wherein the time scheduler 150 can periodically revive the application 100 and/or components 110 thereof (e.g., the flow components 112) to check for and respond to state changes. However, the time scheduler 150 can provide any other suitable function. Each application 100 is preferably associated with a time scheduler 150, but can additionally and/or alternatively be associated with multiple time schedulers 150, and/or any other suitable number of time schedulers. Different components 110 can be associated with the same or different time scheduler 150. The time scheduler 150 is preferably associated with an event loop 130, but can additionally and/or alternatively be associated with a root component 110 (e.g., root flow component 112, root work component 114, etc.), a child component 110 (e.g., child flow component 112, child work component 114, etc.), and/or be otherwise associated. The time scheduler 150 preferably triggers an event loop 130 to execute a root flow component 112 (e.g., with the updated work component 114 state), but can additionally and/or alternatively directly call a root flow component 112 (e.g., with the updated work component 114 state), and/or trigger any other suitable action.

The time scheduler 150 preferably triggers actions at a predetermined frequency (e.g., every 0.1 s, 0.01 s, 1s, minute, hour, day, week, month, year, etc.), but can additionally and/or alternatively trigger an action at random times, and/or be otherwise executed at any other suitable time and/or frequency. The time scheduler 150 is preferably initialized with the application 100, but can additionally and/or alternatively be initialized after the initialization of the application 100, before the initialization of the application 100, and/or be initialized at any other suitable time.

However, the time scheduler can be otherwise configured.

The application 100 can be associated with a set of standard functions, which can be called using a reserved name (e.g., wherein the same reserved name references the same standard function with the same standard logic for each of a plurality of applications). The set of standard functions can be provided by: subclassing an application class (e.g., that exposes the standard functions as hooks); coding the functions into the application file; and/or otherwise providing the set of standard functions. Examples of standard application functions can include "run," "stop", "pause", and/or any other function. In a specific example, calling "run" can: identify the attributes from all components 110 within the application 100 (e.g., from each component's _init_ method), initialize the state storage 120, initialize the event loop 130, and run (e.g., indefinitely run, definitely run, periodically, etc.) the application 100 (e.g., by calling the root component).

The components 110 (discussed previously) function to modularize coordination logic and workflows. However the components 110 can have any other suitable function. The components 110 of the application 100 preferably segregate coordination logic (e.g., logic that coordinates between different jobs) and compute (e.g., jobs), and can further segregate compute, performed by different third-party services, from each other. This can enable components 110 to be reused (e.g., by importing or copying a predefined component) to build different applications 100, and can also enable logic to be more cleanly segregated into different processes, each of which can run on a different machine. Alternatively, coordination logic can be included in the compute, and/or compute can be included in the coordination logic.

Figure 16:
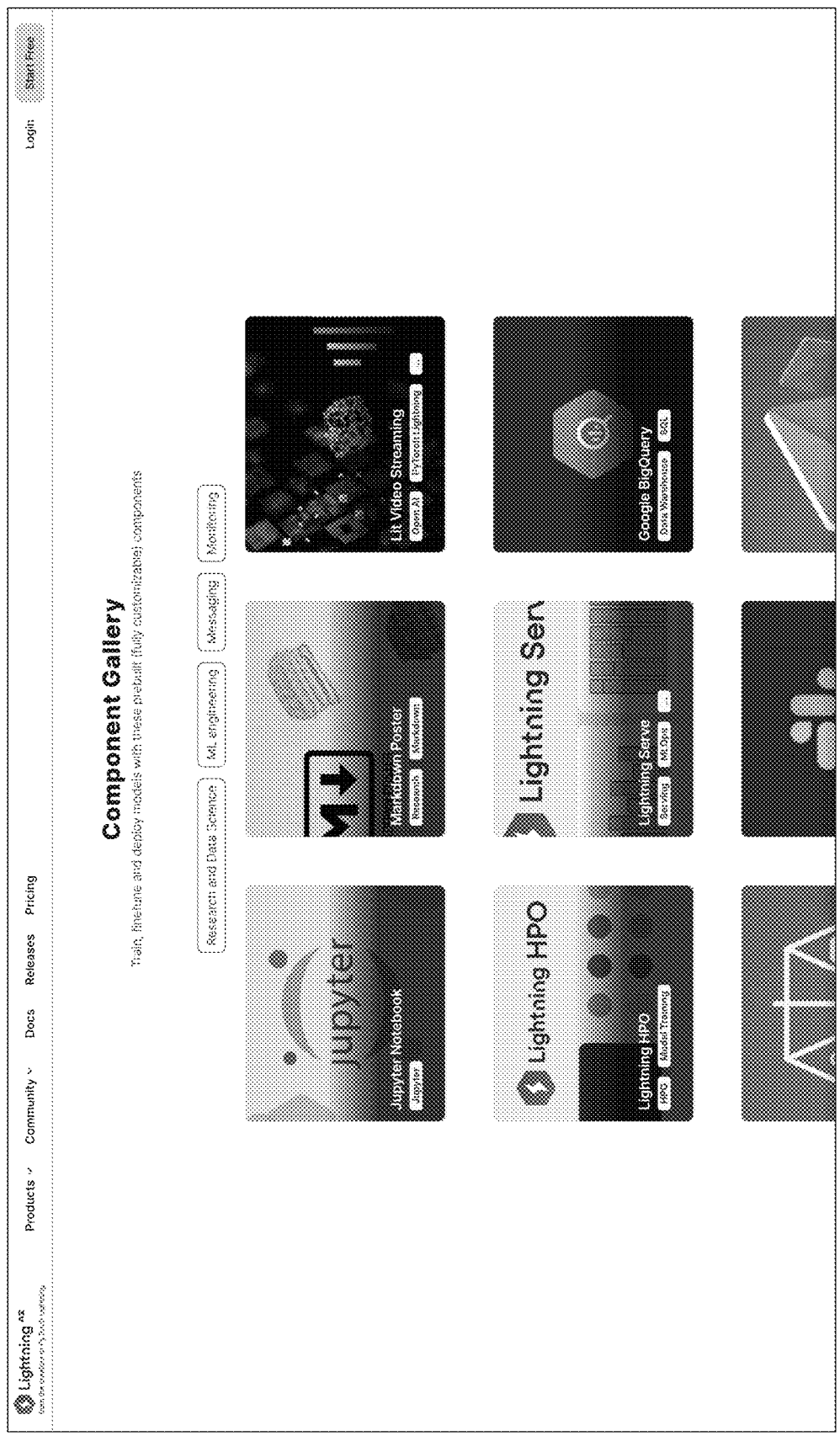
FIG. 16 is an illustrative example of a component store with multiple components.

Each component 110 is preferably authored by a developer, but can additionally and/or alternatively be authored by one or more entities, by a platform, and/or be otherwise determined. Each component 110 can be authored by different authors (e.g., different developers, different entities, etc.), but can additionally and/or alternatively be authored by the same authors. A component can be a generic component, a custom component, and/or be otherwise specialized and/or generalized. The component 110 can be developed as part of the application 100, as a stand-alone component 110 (e.g., and integrated into one or more applications 100), and/or otherwise determined. The component 110 is preferably created programmatically (e.g., a command-line interface, an API, etc.), but can additionally and/or alternatively be created using a codeless interface (e.g., a graphical user interface, a drop-and-drop interface, etc.), and/or be otherwise created. Each component 110 can be used by one or more applications 100 (e.g., wherein the same or different instances of the component can be used by different applications). Predefined components 110 can be accessible via an application store, a component store (example shown in FIG. 16), a reference (e.g., a URI), a repository (e.g., GitHub repository, Amazon S3 repository, etc.), and/or through other suitable mechanism. Predefined components 110 can be public (e.g., accessible to users outside of an entity or organization, available on an application store, etc.), or private (e.g., only accessible to users within an entity or organization, only accessible to users with user credentials, etc.).

Each component 110 is preferably associated with an attribute set and component logic.

The attribute set functions to define the variables that are used within the component 110. The attribute set can also collectively define the component's state. However, the attribute set can provide any other suitable function. The attribute set for each component 110 is preferably unique to the component 110, but can alternatively be nonunique. The attribute set can be defined in a required function (e.g., "_init_"; examples shown in FIG. 5, FIG. 9, and FIG. 10), defined throughout the component code, and/or otherwise defined. The attribute values are preferably bound to the attribute through execution of the component logic, but can additionally or alternatively be set or bound externally (e.g., by another component, such as for work components 114), and/or otherwise be set and/or bound. In an example, the attributes can all be JSON-serializable (e.g., int, float, bool, list, dict, etc.). However, the attributes can be otherwise serializable. In variants, components 110 can retrieve their state and that of their children (e.g., recursively) at any time, and can also set an externally provided state (e.g., recursively) to its children. In variants, the attribute set can include public and/or private attributes. Public attributes can be identified by the application 100 and tracked by the state storage 120, while private attributes can be tracked only in the component's process and not shared to state storage 120.

The component logic functions to define coordination logic (e.g., for coordination logic components/flow components 112) and/or compute logic (e.g., for work components 114) that is run when the component 110 is executed. However, the component logic can provide any other suitable function. The logic is preferably specific to the component 110, but can alternatively be generic among components 110, shared across components, and/or otherwise be specific or generic. In variants, the component logic can reference other components 110 (e.g., direct or indirect child components).

The components 110 can use a set of standard component functions which function to bundle logic that all components 110 of a given component type will need. However, the components can provide any other suitable function. For example, flow components 112 can access a set of standard flow component functions (e.g., "LightningFlow") and work components 114 can access a set of standard application component functions (e.g., "LightningWork"). The logic of the standard component functions is preferably not defined within the component 110, but can additionally and/or alternatively be defined within the component 110, and/or be otherwise defined. The standard component functions are preferably accessible by reserved names, but can additionally and/or alternatively be accessible by non-reserved names, function identifiers, and/or be otherwise accessed. The standard component functions can be accessible to the component 110 by subclassing the component class (e.g., that exposes the standard functions as hooks or inherited functions; examples shown in FIG. 5, FIG. 9, and FIG. 10), by importing a component class package, accessing a component class API, and/or otherwise access the set of standard flow component functions. Examples of standard component functions include: script path (e.g., a function that receives the path of the script to run, accesses the path, and/or runs the script); exposed ports (e.g., a function that exposes the ports used by the component); blocking (e.g., a function that toggles whether a component is a blocking or nonblocking job); cloud compute (e.g., a function that retrieves and executes a hardware module or accelerator satisfying the machine parameters passed to cloud compute); build config (e.g., a function that retrieves a requirement file and container image, and builds a container on a machine); and/or any other standard component function. The set of standard component functions and/or the underlying logic are preferably different for different component types (e.g., flow component 112, work component, etc.), but can additionally and/or alternatively be the same.

Different components 110 can be executed in different processes and/or different machines, or be executed in the same process and/or machine. When the components 110 are executed on different processes and/or machines, they can be reconciled (e.g., such that the components 110 are aware of each other and share information). In variants, the components 110 can be reconciled using a reconciler similar to the experiment reconciler discussed in U.S. application Ser. No. 17/833,421 filed 6 Jun. 2022, incorporated herein in its entirety by this reference (e.g., wherein different components 110 in the same application 100 are analogous to different experiments in the same run); however, any other reconciler can be used.

A component 110 can be: a flow component 112 (coordination logic component), a work component 114 (compute component), and/or any other suitable component.

Flow components 112 function to define coordination logic. When executed, flow components 112 can coordinate and manage execution of: long-running work components 114 and other flow components 112 (e.g., can call methods of other components 110).

Each flow component 112 can execute in one or more processes. All flow components 112 within the same application 100 preferably run in the same process, but can additionally and/or alternatively run in separate processes (e.g., different processes, individual processes, etc.), share processes, and/or be otherwise executed. The one or more processes preferably executes on the same machine, but can additionally and/or alternatively execute on different machines, same user space instance (e.g., container), different user space instances and/or be otherwise executed. The machines are preferably bare metal and/or physical machines (e.g., CPU, GPU, TPU, IPU, etc.), but can additionally and/or alternatively be virtual machines and/or any other suitable machine type. Each machine can be associated with one or more IP addresses. All flow components 112 within the same application 100 preferably access the same state storage 120, but can additionally or alternatively access different state storages 120 and/or any other suitable memory spaces. All flow components 112 within the same application 100 preferably access the same shared storage 140, but can additionally and/or alternatively access different shared storages 140 and/or any other suitable memory spaces.

In variants, each flow component 112 can include: an attribute definition submethod (e.g., defining the flow component's attributes, such as "init") and a run submethod (e.g., defining the flow component's coordination logic), and can optionally include a layout configuration submethod, and/or any other suitable submethod. The run submethod can define: when other components 110 (e.g., work components 114, flow components 112, etc.) should be called, which functions of said components 110 should be called, how the components 110 should be called (e.g., what input attribute values should be passed to the component's functions, how the component 110 should be provisioned, etc.), and/or any other suitable coordination logic. For example, the run submethod can define which work components 110 should be executed responsive to occurrence of a predetermined state (e.g., of one or more other components), and define the parameter values that are passed to said work components 114. However, the run submethod can be otherwise defined. The layout configuration submethod (e.g., "configure_layout") can define values for each of a set of display parameters. Display parameters can include: which attributes or endpoints to display on a user interface (e.g., wherein the attributes or endpoints can be from the ego component or child components), where to display the content (e.g., whether the content should be separated into different tabs or all arranged on the same tab, where in the browser window the content should be displayed, etc.), and/or any other suitable parameter. In a first example, the layout configuration submethod includes the code (e.g., HTML) to generate the graphics based on the application state and/or component artifacts (e.g., determined from the shared storage 140). In a second example, the layout configuration submethod defines which work component's native interface endpoint to use for a given display object (e.g., frame, iFrame, etc.). However, the flow components can be otherwise configured.

In variants, all flow components 112 can access (e.g., use, reference, etc.) a set of standard flow functions. The standard flow functions are preferably external (e.g., external to the flow component 112, external to the flow component file defining the flow component 112, defined by a shared flow library, etc.), but can additionally and/or alternatively be defined within the component, and/or otherwise defined. The flow components 112 can access the set of predefined flow functions by subclassing an external class (e.g., a flow component class, such as "LightningFlow"), importing an external flow component package, accessing a flow component API, and/or otherwise access the set of standard flow component functions. The set of standard flow component functions can include: state (e.g., returns the flow's state and its child components' states); flow components 112 (e.g., returns child flow components 112); work components 114 (e.g., returns child work components 114); set state (e.g., to set the state of the flow and/or its children components); configure layout (e.g., that returns a single frontend object to serve a user interface for the flow; returns a list of dictionaries of child components; etc.); and/or other functions or hooks. However, the flow components 112 can access any other suitable set of predefined functions. Additionally or alternatively, the flow components 112 can reference a set of custom functions (e.g., in addition to or in lieu of the standard functions).

However, flow components can be otherwise defined.

Work components 114 function to define compute logic for jobs (e.g., long-running jobs), wherein computational jobs are executed when the work component 114 is executed. However, the work components can provide any other suitable function. In variants, each work component 114 is preferably self-isolated and cannot call methods of other components 110 (e.g., of other work components 114, flow components 112, application components, etc.). This segregates work component 114 dependency on other work components 114 (e.g., other long-running jobs), which can enable applications 100 to be distributed at scale. In these variants, any state changes happening within the work component 114 will be reflected within the parent flow component 112 (calling the work component 114), but parent flow component state changes may not be immediately propagated back to the work component 114 (e.g., in real time; within the current event loop iteration; in the next event loop iteration; etc.). The state changes within the work component 114 can be: immediately reflected on the work component 114, eventually reflected on the work component 114 (e.g., after one or more iterations, after a predetermined period of time, etc.), never reflected on the work component, and/or otherwise reflected on the work component. Alternatively, the work component state changes can be provided to the state storage 120 (e.g., wherein the work component 114 writes the state changes to the state storage 120). Alternatively, the work components 114 can call methods of other components (e.g., of other work components 114, flow components 112, application components, etc.), and can track the state of child components 110. The work components 114 can be blocking or non-blocking.

Examples of computational jobs executed by work components 114 can include: interaction with a third-party service, long-running jobs (e.g., atomic or non-atomic; jobs that take more than the event loop's cycle time to complete; etc.), non-atomic jobs, asynchronous jobs (e.g., asynchronous from other work components 114, from the flow components 112, etc.), and/or other suitable computational jobs. Illustrative examples of computational jobs include: interfacing with cloud hardware, interacting with an ML framework, hyperparameter optimization, experiment management, generating a web interface, managing cloud storage, managing the shared storage, cloud warehousing, data warehousing, model training (e.g., training a LLM on a cloud service), running a third-party service, performing a query, downloading a dataset, and/or any other suitable computational job. Examples of work components 114 can include: modules that interface with a third-party service (e.g., Stable Diffusion, ChatGPT, Gradio, Slack, Weights & Biases, Comet, Tecton, SageMaker, AWS, Google Cloud, etc.), the third-party service itself, a custom work component (e.g., a custom reinforcement learning component; a custom machine learning model architecture, such as a transformer, DNN, RNN, CNN, etc.; a custom logging component; a custom hyperparameter management component; etc.), and/or perform or interface with any other suitable service that can perform a job.

Each work component 114 can execute in one or more processes. All work components 114 within the same application 100 preferably run in separate processes (e.g., individual processes), but can additionally and/or alternatively run in the same processes, share processes, and/or be otherwise executed. Different processes (e.g., for different work components 114, flow components 112, etc.) can execute on the same machine, different machines, same user space instance (e.g., container), different user space instances, and/or be otherwise executed. The machines are preferably bare metal and/or physical machines (e.g., CPU, GPU, TPU, IPU, etc.), but can additionally and/or alternatively be virtual machines and/or any other suitable machine type. Each machine can be associated with one or more IP addresses.

All work components 114 within the same application 100 preferably provide attribute values (e.g., the component's state) to the same state storage 120, but can additionally or alternatively access different stage storages 120, and/or any other suitable memory spaces. Each work component 114 can use the state storage 120 as its attribute store (e.g., wherein the work component's process does not locally track the attribute value), but can alternatively store copies of its attribute values to the state storage 120 (e.g., wherein the state storage 120 stores a copy of the work component's locally tracked attribute value). However, the work components 114 can otherwise interact with the state storage 120. During execution, the work component's attribute values (e.g., state) and/or value changes (e.g., state changes) can be communicated to the event loop 130 (e.g., directly by the work component, directly by the parent flow component calling the work component, indirectly by monitoring the state storage, etc.), wherein the event loop 130 re-executes the root flow component 112 with the updated work component 114 state. However, work component state changes can be otherwise used.

All work components 114 within the same application 100 preferably access the same shared storage 140, but can additionally and/or alternatively access (e.g., read and/or write) data (e.g., inputs, artifacts, etc.) different shared storages 140, and/or any other suitable memory spaces.

In variants, each work component 114 can include: an attribute definition submethod (e.g., defining the work component's attributes, such as "_init_") and a run submethod (e.g., defining the work component's computational logic), and/or any other suitable submethod. In an example, the run submethod can define which attributes to pass to which third-party function (e.g., define a sequence of third-party API calls and the respective arguments). However, the run submethod can define any other suitable logic. In embodiments, the work component 114 can also define different submethods for local and cloud computing (e.g., using reserved names), wherein the correct submethod is automatically selected (e.g., using the reserved name) based on which hardware (e.g., local or cloud) is specified by the machine parameters (e.g., specified in the parent flow method). In an illustrative example, the run submethod can define a series of API or function calls to a third-party service, using argument values received from the parent flow component 112 (e.g., set by the developer or retrieved from state storage) or set by the component developer.

However, the work components can be otherwise configured.

In variants, all work components 114 can access (e.g., use, reference, etc.) a set of predefined functions (e.g., hooks, etc.). The predefined functions can include standard work functions, third-party functions (e.g., example shown in FIG. 1), and/or any other suitable function. The predefined functions are preferably external (e.g., external to the work component, external to the work component file defining the work component, etc.), but can additionally and/or alternatively be defined within the work component, and/or be otherwise defined. The work components 114 can access the set of predefined work functions by subclassing an external class (e.g., a work component class, such as "LightningWork"), importing an external package (e.g., a work component package, a third-party service's package, etc.), accessing an external API, and/or otherwise access the set of predefined functions. Additionally or alternatively, the work components 114 can reference a set of custom functions (e.g., in addition to or in lieu of the standard functions).

The set of predefined functions can include: a set of standard work component functions, a set of third-party functions, and/or any other suitable set of functions.

The set of standard work component functions can include: blocking (e.g., specifies whether to run in blocking or non-blocking mode; can default to blocking); run once (e.g., specifies whether to run the "run" method once for each unique set of argument values); raise exception (e.g., whether to re-raise an exception in the flow component 112 when raised from within the work component "run" method); exposed ports (e.g., returns a dictionary of ports exposed by the work component); build configuration (e.g., specifies the requirements or path to the requirement files and the path to the container image, such as a dockerfile, used to build the container; where the work component 114 can define different build configurations for local vs cloud execution); cloud compute (e.g., specifying the machine parameters to use for work component 114 execution); and/or other functions or hooks. Examples of machine parameters can include: hardware type (e.g., CPU, GPU, TPU, IPU, etc.), the number of machines to use (e.g., number of bare metal machines, number of virtual machines, etc.), the disk size (e.g., in GB), a set of cluster identifiers (e.g., wherein the work component 114 is run in the identified cluster(s)), whether to use a spot instance, number of seconds to wait before timeout, number of seconds of permitted idling, and/or any other suitable parameters. In variants, the hardware module (e.g., "accelerator") satisfying the combination of machine parameter values can be selected and used to provision and manage work execution within said machines.

The set of third-party functions can include: calls to functions in an imported package, API calls (e.g., an HTTP request), third-party service specific calls or requests, and/or any other function call. The third-party functions can be provided by a third-party package (e.g., imported into the application, imported into the work component, etc.), provided by the third-party API, and/or otherwise provided.

However, the work components can access any other suitable set of predefined functions.

In variants, the components 110 can be used with a path object, which functions as a cross-process pointer. This can be useful since, when running applications 100 in a fully distributed manner, the data available on one machine won't necessarily be available on another one. Using a path object that tracks filepaths (e.g., URIs, directory paths, etc.) and can be passed between components can make data available across different machines (e.g., ensure that the same application code can run locally and in the cloud, without modification). The path's value can be hidden from a user (e.g., the absolute path's value is hidden from a user), revealed to a user, and/or otherwise hidden and/or revealed. The path can be a relative path (e.g., a filepath within the application's storage directory, independent of where the application's shared storage 140 is), an absolute path (e.g., includes the application's shared storage identifier), and/or be otherwise defined. The path's value (e.g., the filepath) can be hardcoded into the component 110 dynamically defined by a component 110, defined by an application 100, and/or be otherwise defined. For example, the path's value can be set by a work component 114 that identifies the filepath to the best ML model from a set of candidate ML models.

The application 100 can serve a user interface (UI) during execution. The user interface can function as an interface for user interaction with the application 100 (e.g., provide inputs, display outputs, etc.), and can enables a developer to create customized, interactive UIs with any framework. In variants, a developer can easily embed other tools and services (e.g., such as embedding a GitHub repository, a S3 repository, a A FastAPI Service, arXiv paper or a Dask Cluster Admin page, etc.), or create a complete UI from scratch. The user interface parameters (e.g., appearance, layout, connected components, etc.) are preferably specified by the configure layout function (e.g., in the root flow component 112; in each individual component 110; etc.), but can be created by default (e.g., an interface is created for each component 110), be created using a no-code or codeless interface (e.g., a drag-and-drop interface), or otherwise created. The UI can be accessible via: a browser, a native application, a URI, and/or any other interface. The UI can provide an interface to one or more components 110. In one example, the UI provides an interface to a flow component 112, which enables the user to provide inputs (e.g., attribute values for one or more child components; select a component to execute; etc.), see flow component-accessible information (e.g., component states), and/or otherwise interact with the flow component 112. In a second example, the UI provides an interface to a third-party work component, which enables the user to provide inputs to the instance of the third-party service associated with the work component 114 and/or see outputs from said instance.

In one variant, the UI includes a set of frames (e.g., iFrames) in one or more browser tabs or windows, wherein each frame provides the interface (e.g., input and/or output interface) to a different component 110. The content displayed within each frame can be served by the machine or process executing the respective component (e.g., example shown in FIG. 8), or be otherwise provided. In operation, a user can interface directly with a component 110 (e.g., with the process or machine running the component) through the respective frame, wherein the component 110 controls the layout and appearance within the frame. For example, an application 100 using two third-party services can have a frame for each service, each displaying the respective third-party services' user interface (e.g., the third party service's native interface). Additionally or alternatively, the application 100 can skin the frames to adjust each component's appearance (e.g., to create an application 100 with a more uniform appearance), and/or otherwise adjust the displayed content. However, any other UI can be used.

However, the one or more applications can be otherwise configured.

5. Method

Variants of the application execution method can include: initializing the processes for each component of the application S100; executing the components of the application S200; and optionally providing access to components in a user interface S300. However, the method can include any other suitable elements. One or more instances of the method can be repeated for one or more applications 100, one or more components 110 (e.g., flow components 112, work components 114, etc.), one or more timeframes, and/or otherwise repeated. All or portions of the method can be performed continuously, recurrently (e.g., monthly, weekly, daily, hourly, etc.), upon receipt of a request, and/or at any other time and/or frequency.

The application 100 can be executed on the developer's machines (e.g., under a developer's platform or cloud account; on machines physically hosted by the developer; etc.), but can additionally and/or alternatively executed on the users' machines (e.g., wherein the users modify the application's machine arguments to specify the user's machines), third-party machines, and/or any other suitable machines.

The method is preferably performed by the AI/ML development system 10 disclosed above, but can additionally and/or alternatively be performed by any other suitable system.

Initializing the process for each component S100 functions to prepare each component for execution. The processes can be initialized by the main computing system (e.g., the computing system executing the flow components), by a preliminary computing system, by a user, and/or by any other suitable computing system. S100 is preferably performed before S200, but can additionally and/or alternatively be performed concurrently with S200, after S200, and/or any other suitable time. S100 can be performed: responsive to a user initializing the application, at a predetermined frequency, responsive to occurrence of a predetermined event (e.g., receipt of an application call), and/or at any other suitable time.

Initializing the processes (e.g., computing processes) for each component of the application S100 can include: identifying each component 110 of the application 100; initializing a process for the flow components 112; and initializing individual processes for the work components 114 (e.g., according to the work component's compute parameters). However, the component processes can be otherwise initialized. Identifying each component 110 of the application 100 can include identifying all child components 110 (e.g., including direct children and indirect children) referenced in the root flow component 112; identifying all classes or components 110 defined within the application 100; and/or otherwise identifying the components. Identifying the components 110 can optionally include classifying the components 110 as work components 114 or flow components 112 (e.g., based on which component class each component subclassed, based on whether the component 110 references third-party function calls, etc.). Initializing the process for the flow components 112 can include: initializing a process on the local machine (e.g., for the root flow component 112); identifying a set of cloud computing parameters for a flow component 112 (e.g., the root flow component) and initializing a cloud machine satisfying the computing parameters (e.g., discussed below); and/or otherwise initializing the process for the flow components 112 (e.g., all flow components 112). Initializing individual processes for the work components 114 can include: identifying the set of cloud computing parameters for each work component 114, retrieving hardware modules satisfying the set of cloud computing parameters (e.g., wherein the hardware modules define how to coordinate between the work component 114 and the hardware itself, such as those described in U.S. application Ser. No. 17/741,028 filed 10 May 2022, which is incorporated herein in its entirety by this reference), optionally determining a computing cluster (e.g., a default cluster or a cluster identified in the cloud computing call, etc.), and provisioning the machines (e.g., within the cluster) using the hardware modules. In variants, user credentials (e.g., API tokens, logins, etc.) can be used to access the computing cluster for provisioning and management. In variants, initializing individual processes for the work components 114 can optionally include loading packages (e.g., for the component class, for third-party services referenced in the respective work component, etc.), on the respective machines. However, the individual processes for the work components can be otherwise initialized. However, the processes can be otherwise initialized.

In variants, the method can optionally include initializing a state storage 120, collecting the component states for each component (e.g., each work component 114, each flow component 112, etc.), and tracking the component states in the state storage 120. Collecting the component states for each component 110 can include: requesting the state values from each component 110 (e.g., using parent flow components 110); passing a state storage identifier (e.g., filepath, URI, etc.) to each component 110, wherein each component 110 writes their own state to the state storage 120; and/or otherwise collecting the component states. In variants, only the state changes are provided to the state storage 120; alternatively, the new state variable values (e.g., for a subset or all of a component's state) can be provided to the state storage 120.

In variants, the method can optionally include initializing an event loop 130; and calling, by the event loop 130, a component 110 at a predetermined frequency. In a first embodiment, the called component is a root component 110 (e.g., root flow component 112). In a second embodiment, the called component 110 is associated with a component identifier that was stored during the last round of execution (e.g., before the current execution iteration called by the event loop 130). However, the called component can be any other suitable component.

In variants, the method can optionally include initializing a shared storage 140, collecting data for all or a subset of the components 110 (e.g., each work component 114, each flow component 112, etc.), tracking data in the shared storage 140, and exchanging data between different components 110. In a first embodiment, the component data can be retrieved by a parent component 110 (e.g., requested from the child component 110) and stored in the shared storage 140. In a second embodiment, the component 110 can provide a component-specific storage identifier (e.g., pointer, URI, filepath, IP address, etc.), wherein the component-specific storage identifier can be stored by the state storage 120, stored in the shared storage 140, passed to other components 110 (e.g., during other component initialization), and/or otherwise managed. In this embodiment, other components 110 that need to access the data in the component-specific storage can retrieve the identifier and use the identifier to access said data. In a third embodiment, an identifier for the shared storage 140 (e.g., URI, pointer, filepath, IP address, etc.) can be determined (e.g., by a root component 110, by a flow component 112, etc.), and passed to the other components 110 (e.g., during initialization, as a storage parameter, etc.), wherein the other components can write their data to the identified shared storage 140. However, the shared storage can be otherwise initialized.

In variants, the method can optionally include initializing a time scheduler 150; and at a predetermined frequency, triggering, by the time scheduler 150, the event loop 130 that calls a root component 110. However, the time scheduler 150 can be otherwise initialized.

Executing the components of the application S200 functions to run the application logic. This can be performed periodically (e.g., at the event loop 130 execution frequency; every 0.1 s, 1 s, minute, hour; etc.), when a component state changes, at random times, and/or at any other suitable time and/or frequency. Executing the application preferably includes calling the root flow component 112, wherein the root flow component 112 calls the other components 110 (e.g., other child work components 114, other child flow components 112, etc.), but can alternatively include calling the subsequent component 110 in a series of components 110 (e.g., wherein the component series is defined by the root flow component 112), and/or be otherwise performed. During execution, each component 110 can write its state (e.g., attribute values) and/or its child components' states to the state storage 120, wherein subsequent component execution can use the updated state. During execution, when a flow component's 112 subsequent component is a work component 114, the work component 114 can expose an IP address to the flow component 112, such that the flow component 112 can pass the IP address to other work components 114 and the work components 114 can independently coordinate (e.g. inter-work component communication).

In an illustrative example, running the flow component 112 can include: identifying the attributes from each child component 110 (e.g., from the respective "_init_" submethods); storing the attributes in the state storage 120; optionally determining whether the flow component 112 is to be executed locally or in the cloud (e.g., based on whether the cloud compute function is called; based on the cloud compute parameter values); initializing the configuration file for the flow component 110; initializing the machines when the flow component 112 is to be executed in the cloud (e.g., using a hardware module satisfying the combination of machine parameter values specified in the cloud compute function call); building the flow component configuration in the machine(s); and executing the logic specified in the "run" submethod of the flow component 112. Executing the logic specified in the "run" submethod can include: monitoring a set of component states in the state storage 120, and executing logic (e.g., calling other components 110) responsive to a component state satisfying a set of conditions specified in the "run" submethod, and/or be otherwise performed. However, the flow component can be otherwise executed.

In an illustrative example, running the work component 114 can include: importing a third-party package that provides a programmatic interface into the third-party's API (e.g., translates programmatic function calls to API-specific protocols); setting the argument values for the standard work component functions to default values, user-specified values, or flow-specified values; determining whether the work component 114 is to be executed locally or in the cloud (e.g., based on whether cloud compute is called; based on the cloud compute parameter values); initializing the local build configuration or cloud build configuration when the work component 114 is to be executed locally or in the cloud, respectively; initializing the machines when the work component 114 is to be executed in the cloud (e.g., using a hardware module satisfying the combination of machine parameter values specified in the cloud compute function call); building the local or cloud configuration in the machine(s); and executing the logic specified in the "run" submethod of the work component 114. The logic specified in the "run" submethod can be executed responsive to receipt of a call from another component 110 (e.g., a flow component 112, another work component 114), be responsive to initialization, and/or executed at any other suitable time. Executing the logic specified in the "run" submethod can include: receiving parameter values from another component 110 (e.g., as part of a request or call); retrieving data from the shared storage 140 and/or state storage 120; executing the logic based on the parameter values and/or retrieved data (e.g., training models, gathering data, adjusting hyperparameters, writing logs and artifacts, etc.); writing new states and/or state changes to the state storage 120; writing data to the shared storage 140; and/or performing any other suitable processes. However, the work component can be otherwise executed.

In variants, the method can additionally include: monitoring a performance metric for the components 110, and automatically adjusting the computing resources for each component 110 based on the performance metric. This can function to improve component performance (e.g., increase component work queue execution speed, increase component efficiency, increase component accuracy, etc.). This can be performed automatically, manually, and/or otherwise performed. This is preferably coordinated and/or performed by the flow component(s) 112, but can alternatively be coordinated and/or performed by the work component(s) 114. The computing resources are preferably adjusted for work components 114, but can additionally or alternatively be adjusted for flow components 112. Examples of adjusting the computing resources can include: scaling the work component 114 to other machines (e.g., laterally scaling the work component 114), increasing or decreasing the processing power allocated to the work component 114, increasing or decreasing the memory allocated to the work component 114, and/or otherwise adjusting the computing resources. Examples of performance metrics can include: queue size (e.g., for the number of jobs or requests that need to be processed by a given component instance), job size (e.g., the size of the job itself), accuracy, speed, the amount of computational resources requested by the process running the component, and/or other performance metrics. In an illustrative example, the flow component 112 can monitor the work queue for a diffusion model work component 114 (e.g., a Stable Diffusion work component), automatically provision additional machines and initialize additional diffusion model work component instances on the additional machines when the work queue exceeds a predetermined threshold, and automatically shut down and consolidate jobs into a subset of the prior work queues when the work queue falls below a threshold (e.g., batching iterations from different work queues into a single batch where each iteration is a different run).

However, the components of the application can be otherwise executed.

Providing access to components in a user interface S300 functions to provide an interface that enables a user to interact with one or more component instances. The components 110 can include all application components 110, a subset of the components 110, only work components 114, only flow components 112, and/or any other suitable set of components. In variants, this can include presenting a set of frames (e.g., iFrames) connected to the user interfaces of each of a set of executing component instances; example shown in FIG. 8. However, the component instances can be otherwise accessed by the user (e.g., via a component-specific URI, via the third-party service, etc.).

However, the application can be otherwise executed.

Different processes and/or elements discussed above can be performed and controlled by the same or different entities. In the latter variants, different subsystems can communicate via: APIs (e.g., using API requests and responses, API keys, etc.), requests, and/or other communication channels.

Alternative embodiments implement the above methods and/or processing modules in non-transitory computer-readable media, storing computer-readable instructions that, when executed by a processing system, cause the processing system to perform the method(s) discussed herein. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various elements discussed above, and/or omit one or more of the discussed elements, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the embodiments of the invention without departing from the scope of this invention defined in the following claims.

We claim:

1. A system, comprising:
a computing system configured to manage a set of components and a shared state storage system, the set of components comprising a set of flow components and a set of work components, wherein each flow component of the set of flow components defines coordination logic between other components of the set of components, and wherein each work component of the set of work components defines computation logic.

2. The system of claim 1, wherein the shared state storage system is configured to track a set of component states for the set of components.

3. The system of claim 2, wherein each component state comprises values for a set of attributes defined within a component.

4. The system of claim 1, wherein a work component of the set of work components defines computation logic for optimizing a set of parameters, wherein a component state of the set of component states comprises values for the set of parameters.

5. The system of claim 4, wherein the set of parameters comprises a set of hyperparameters.

6. The system of claim 2, wherein a flow component of the set of flow components is executed in response to the shared state storage reflecting a change in a component state associated with a work component of the set of work components.

7. The system of claim 1, wherein the computing system comprises a distributed computing orchestration system.

8. The system of claim 1, further comprising a shared storage configured to exchange data between different components of the set of components.

9. The system of claim 1, wherein a work component of the set of work components defines computation logic for training a machine learning model.

10. The system of claim 1, wherein a work component of the set of work components defines computation logic for running a third-party service.

11. The system of claim 1, wherein each work component of the set of work components is executed on a different machine.

12. A method, comprising:
initializing a set of components comprising a set of flow components and a set of work components, wherein each flow component of the set of flow components is configured to coordinate execution of other components of the set of components, and wherein each work component of the set of work components is configured to perform a task; and
tracking a set of component states for the set of components.

13. The method of claim 12, wherein each component of the set of components writes a component state to a shared state storage.

14. The method of claim 12, wherein a flow component of the set of flow components is executed in response to a change in a component state associated with a work component of the set of work components.

15. The method of claim 12, wherein the task comprises at least one of:
training a model, optimizing hyperparameters, managing data, or running a third-party service.

16. The method of claim 12, further comprising triggering execution of the set of components.

17. The method of claim 16, wherein triggering execution of the set of components comprises triggering a call to a root flow component of the set of flow components, wherein the root flow component calls a subset of the set of components referenced by the root flow component.

18. The method of claim 16, wherein the set of components are executed on at least one of a developer infrastructure, a platform infrastructure, or a user infrastructure.

19. The method of claim 16, wherein each work component of the set of work components is executed on a different machine.

20. The method of claim 12, wherein each component state comprises values for a set of attributes defined within a component.

* * * * *